United States Patent
Chen et al.

(10) Patent No.: US 9,299,124 B2
(45) Date of Patent: Mar. 29, 2016

(54) PADDING FOR MULTI-CHANNEL MEMORY

(75) Inventors: Lin Chen, San Diego, CA (US); Piyush Agarwal, San Diego, CA (US); Long Chen, San Diego, CA (US); Lingjun Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 966 days.

(21) Appl. No.: 13/491,452

(22) Filed: Jun. 7, 2012

(65) Prior Publication Data

US 2013/0328889 A1 Dec. 12, 2013

(51) Int. Cl.
*G06T 1/60* (2006.01)

(52) U.S. Cl.
CPC ........................ *G06T 1/60* (2013.01)

(58) Field of Classification Search
CPC .... G06T 1/60; G06F 12/0607; H03M 13/275; H03M 13/276
USPC .................. 345/520, 501, 530, 540
See application file for complete search history.

(56) References Cited

U.S. PATENT DOCUMENTS

| | | | |
|---|---|---|---|
| 5,982,384 A | 11/1999 | Prouty et al. | |
| 6,041,393 A | 3/2000 | Hsu | |
| 6,374,341 B1 | 4/2002 | Nijhawan et al. | |
| 6,499,095 B1 | 12/2002 | Sexton et al. | |
| 6,850,241 B2 | 2/2005 | Champion | |
| 6,877,076 B1 | 4/2005 | Cho et al. | |
| 7,209,141 B2 | 4/2007 | Garg et al. | |
| 7,418,571 B2 | 8/2008 | Wolrich et al. | |
| 7,558,947 B1 | 7/2009 | Trivedi et al. | |
| 7,681,013 B1 | 3/2010 | Trivedi et al. | |
| 7,872,657 B1 | 1/2011 | Edmondson et al. | |
| 8,072,463 B1 | 12/2011 | Van Dyke et al. | |
| 8,108,648 B2 | 1/2012 | Srinivasan et al. | |
| 2005/0135493 A1* | 6/2005 | Maltsev et al. | 375/260 |
| 2007/0242085 A1 | 10/2007 | Weybrew et al. | |
| 2010/0076941 A1 | 3/2010 | Dotsenko et al. | |
| 2010/0274976 A1 | 10/2010 | Kang et al. | |
| 2011/0292725 A1 | 12/2011 | Choi et al. | |
| 2013/0326158 A1 | 12/2013 | Chen et al. | |

FOREIGN PATENT DOCUMENTS

EP 2453360 A2 5/2012

OTHER PUBLICATIONS

Second Written Opinion from International Application No. PCT/US2013/039725, dated Jul. 1, 2014, 7 pp.
Habich et al., "Performance engineering for the Lattice Boltzmann method on GPGPUs: Architectural requirements and performance results," Computers & Fluids, Dec. 6, 2011, 10 pp.
U.S. Appl. No. 13/487,813, by Lin Chen, filed Jun. 4, 2012.
International Search Report and Written Opinion—PCT/US2013/039725—ISA/EPO—Sep. 4, 2013, 12 pp.

(Continued)

*Primary Examiner* — Phi Hoang
*Assistant Examiner* — Michael Le
(74) *Attorney, Agent, or Firm* — Shumaker & Sieffert, P.A.

(57) ABSTRACT

Techniques described in the disclosure are generally related to reserving padding bytes in system memory when storing data in the system memory. The reserving of padding bytes may allow a memory interface to efficiently utilize the channels to the system memory when storing or subsequently retrieving the data.

36 Claims, 21 Drawing Sheets

(56) References Cited

OTHER PUBLICATIONS

McCormack et al., "Neon: A Single-Chip 3D Workstation Graphics Accelerator," ACM, New York, USA, 1998, ACM sections 5.2.3 and 5.2.4; figure 4, 10 pp.

International Preliminary Report on Patentability—PCT/US2013/039725, The International Bureau of WIPO—Geneva, Switzerland, Sep. 30, 2014, 7 pp.

* cited by examiner

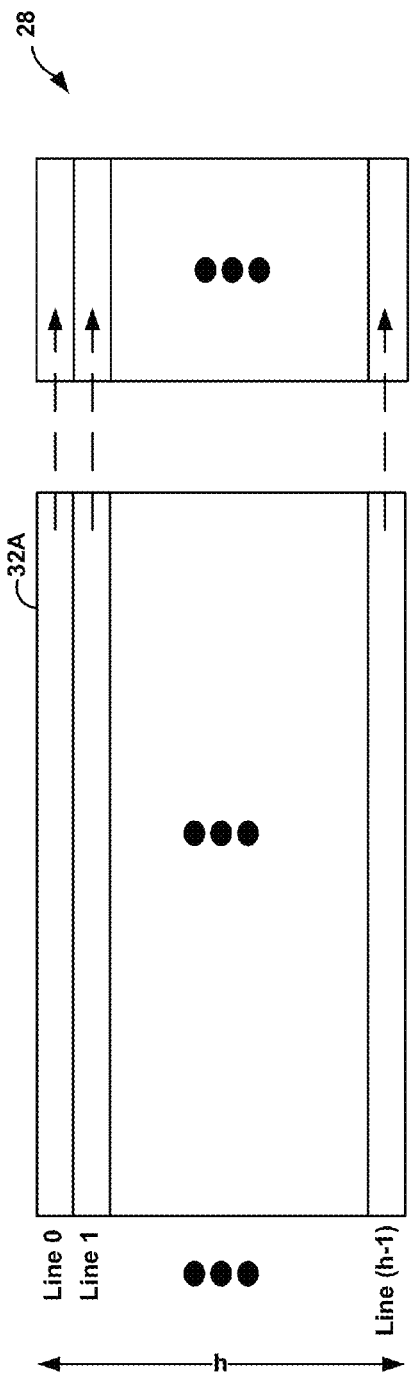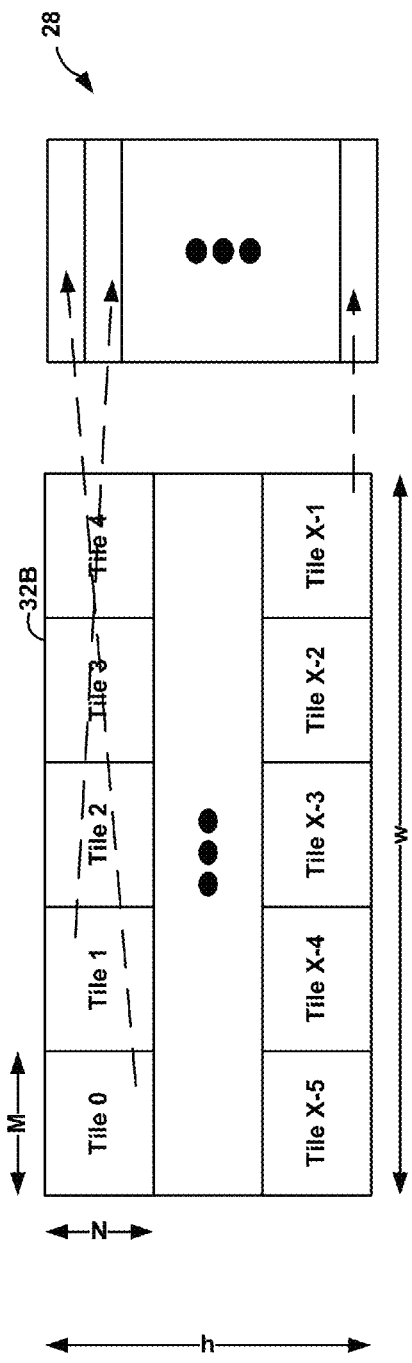

PADDING FOR MULTI-CHANNEL MEMORY

TECHNICAL FIELD

This disclosure relates to the storage and retrieval of data, and more particularly, to the storage and retrieval of data by a graphics processing unit (GPU).

BACKGROUND

Various processing units such as a graphics processing unit (GPU) retrieve data from and store data into a system memory, which is the memory for the device that houses the GPU. The system memory is capable of storing vast amounts of data. The GPU retrieves data from and stores data into the system memory via a system bus that couples the GPU to the system memory.

SUMMARY

In general, the techniques described in this disclosure are directed to memory padding to balance memory access between memory units of a system memory. For example, an integrated circuit (IC) may include a plurality of memory controllers. Each of the memory controllers may access each one of the memory units within the system memory. As described in more detail, by padding, the IC stores data into the memory units in such a manner that, when the data is to be subsequently retrieved, the memory controllers are able to retrieve the data from memory units in parallel (e.g., at the same time).

In one example, the disclosure describes a method that includes receiving, with a memory interface, a plurality of instructions that instruct the memory interface to store pixel values of a surface in a system memory. The method also includes storing, with the memory interface, the pixel values of the surface, in bits of the system memory other than reserved padding bits in the system memory, in an interleaving manner between at least a first memory unit of the system memory via a first memory controller, and a second, different memory unit of the system memory via a second, different memory controller such that a first set of pixel values of a display tile are stored within the first memory unit via the first memory controller and a second set of pixel values of the same display tile are stored within the second memory unit via the second memory controller.

In another example, the disclosure describes an integrated circuit (IC) that includes a first memory controller operatively coupled to a first memory unit of a system memory, a second, different memory controller operatively coupled to a second, different memory unit of the system memory, and a memory interface. The memory interface is configured to receive a plurality of instructions that instruct the memory interface to store pixel values of a surface in the system memory. The memory interface is also configured to store the pixel values of the surface, in bits of the system memory other than reserved padding bits in the system memory, in an interleaving manner between at least the first memory unit of the system memory via the first memory controller, and the second, different memory unit of the system memory via the second, different memory controller such that a first set of pixel values of a display tile are stored within the first memory unit via the first memory controller and a second set of pixel values of the same display tile are stored within the second memory unit via the second memory controller.

In another example, the disclosure describes a device that includes a system memory comprising at least a first memory unit and a second, different memory unit, and an integrated circuit (IC). The IC includes a first memory controller operatively coupled to the first memory unit of the system memory, a second, different memory controller operatively coupled to the second, different memory unit of the system memory, and a memory interface. The memory interface is configured to receive a plurality of instructions that instruct the memory interface to store pixel values of a surface in the system memory. The memory interface is also configured to store the pixel values of the surface, in bits of the system memory other than reserved padding bits in the system memory, in an interleaving manner between at least the first memory unit of the system memory via the first memory controller, and the second, different memory unit of the system memory via the second, different memory controller such that a first set of pixel values of a display tile are stored within the first memory unit via the first memory controller and a second set of pixel values of the same display tile are stored within the second memory unit via the second memory controller.

In another example, the disclosure describes a device that includes a system memory comprising at least a first memory unit and a second, different memory unit, and an integrated circuit (IC). The IC includes a first memory controller operatively coupled to the first memory unit of the system memory, and a second, different memory controller operatively coupled to the second, different memory unit of the system memory. The IC also includes means for receiving, with a memory interface, a plurality of instructions that instruct the memory interface to store pixel values of a surface in a system memory, and means for storing, with the memory interface, the pixel values of a surface, in bits of the system memory other than reserved padding bits in the system memory, in an interleaving manner between at least a first memory unit of the system memory via a first memory controller, and a second, different memory unit of the system memory via a second, different memory controller such that a first set of pixel values of a display tile are stored within the first memory unit via the first memory controller and a second set of pixel values of the same display tile are stored within the second memory unit via the second memory controller.

In another example, the disclosure describes a computer-readable storage medium. The computer-readable storage medium having stored thereon instructions that upon execution cause one or more processors to instruct a memory interface to store pixel values of a surface, in bits of a system memory other than reserved padding bits in the system memory, in an interleaving manner between at least a first memory unit of the system memory via a first memory controller, and a second, different memory unit of the system memory via a second, different memory controller such that a first set of pixel values of a display tile are stored within the first memory unit via the first memory controller and a second set of pixel values of the same display tile are stored within the second memory unit via the second memory controller.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A and 3B are conceptual diagrams that illustrate examples of storing pixel values in a linear and tiled fashion.

DETAILED DESCRIPTION

Figure 1:
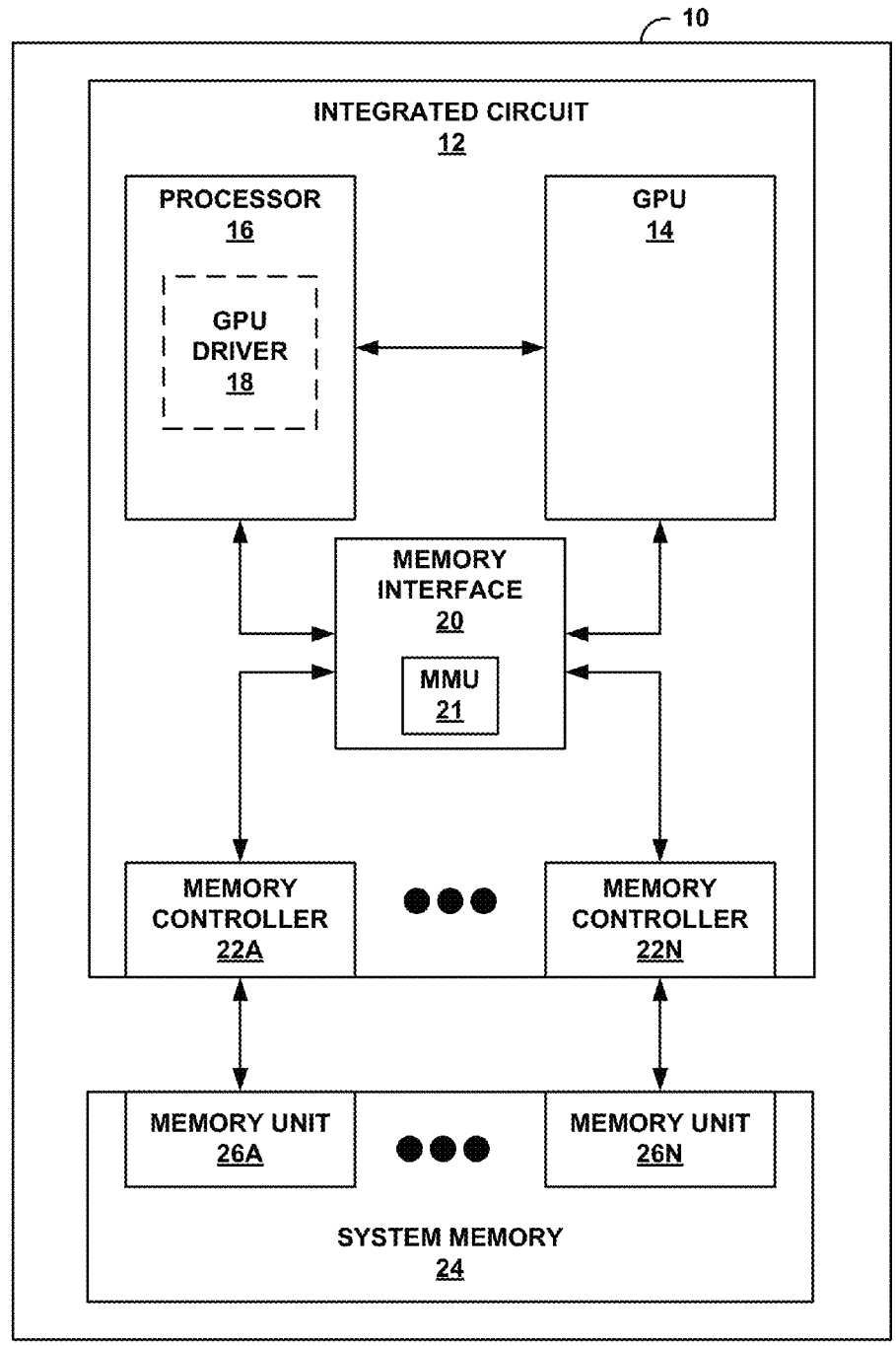
FIG. 1 is a block diagram illustrating an example of a device that may be configured to implement one or more aspects of this disclosure.

An integrated circuit (IC) may include one or more processing units such as a graphics processing unit (GPU) and a processor. The IC may also include a memory interface unit (MIF) and a plurality of memory controllers (MCs). Each one of the MCs may allow the GPU and the processor to access a corresponding memory unit in a system memory. For instance, the system memory may be the overall memory for the device that houses the IC, and generally provides a relatively large amount of storage capability compared to memory local to the IC such as a cache memory within the IC.

The term integrated circuit, or IC, as used in this disclosure is used to describe circuitry that includes a combination of different components such as the processor, GPU, MIF, and MCs. The term integrated circuit, or IC, should not be interpreted to mean that these various components reside within a common package or housing. For example, the IC may include two different chip-packages. The first package may include the processor, MIF, and MCs, and the second package may include the GPU. Other permutations and combinations may be possible, including examples where there are more than two packages that together form the IC. It may also be possible for a single package to include the processor, GPU, MIF, and MCs.

In some examples, the system memory may be divided into a plurality of memory units, and each one of the memory units may be controlled by a corresponding MC. For example, assume there are two memory units (memory unit 0 and memory unit 1) within the system memory, and two MCs (MC0 and MC1) within the IC. In this example, MC0 provides the GPU and the processor with access to memory unit 0, and MC1 provides the GPU and the processor with access to memory unit 1. It may not be possible to access memory unit 0 from MC1, and may not be possible to access memory unit 1 from MC0.

For purposes of illustration and to ease with description, the following examples are described in context of the system memory including two memory units (memory unit 0 and memory unit 1) which are controlled by the two MCs (MC0 and MC1), respectively. However, the techniques described in this disclosure are not so limited. The system memory may include more than two memory units, and the IC may include more than two MCs.

The memory interface unit (MIF) provides the GPU with access to the MCs. For example, the MIF includes a memory management unit (MMU) that maps virtual memory addresses into physical addresses of the system memory. The GPU retrieves or stores data using the virtual address for where the data is stored or to be stored in the system memory. The MIF converts the virtual address into the physical address for the system memory.

For instance, modern operating systems (OS) that run on the processor, which may be a central processing unit (CPU), typically use a virtual memory scheme for allocating memory to multiple to various components such as the GPU. Virtual memory is a memory management technique that virtualizes system physical memory (e.g., RAM, disk storage, etc.) so that the GPU may need only to refer to one set of memory (i.e., the virtual memory). Virtual memory consists of contiguous address spaces that are mapped to locations in physical memory. In this way, the fragmentation of physical memory is "hidden" from the GPU, which instead may interact with contiguous blocks of virtual memory. The contiguous bocks in virtual memory are typically arranged into "pages." Each page is some fixed length of contiguous blocks of virtual memory addresses. Mapping from the virtual memory to the physical memory is often handled by a memory management unit (MMU), which is part of the MIF in examples described in this disclosure.

When storing data transmitted by the GPU, or another component within the IC, the MIF may utilize an interleaving manner for storing the data. The interleaving manner of storage refers to MC0 storing a first set of bits in memory unit 0, followed by MC1 storing a second set of bits in memory unit 1, followed by MC0 storing a third set of bits in memory unit 0, following by MC1 storing a fourth set of bits in memory unit 1, and so forth. In other words, the interleaving manner of storage may be considered as alternating the storage of sets of bits in memory unit 0 and memory unit 1. The number of bits that are stored per interleave cycle may be referred to as an interleave granularity. The interleave granularity may be defined in bytes, where one byte equals eight bits. The interleave granularity may be preprogrammed or selectable.

As an illustrative example, the GPU may transmit the data that is to be stored and the virtual addresses of where the data is to be stored to the MIF. The MIF, in turn, maps the virtual addresses to physical addresses, and stores the data in system memory. In examples described in this disclosure, the MIF may store the data in an interleaving manner in memory unit 0 via MC0 and memory unit 1 via MC1 based on the interleave granularity.

In some examples, MC0 and MC1 may store data in pages of the system memory, where a page may encompass both memory unit 0 and memory unit 1. For example, a page may include four sections 0-3. Sections 0 and 2 may be part of memory unit 0, and sections 1 and 3 may be part of memory unit 1. The MIF may map a virtual page to the four sections of the physical page, and store data of the virtual page in the sections of the physical page in an interleaving manner. However, aspects of this disclosure are not limited to examples where the system memory includes pages. For purpose of illustration various examples are described in context where the system memory includes pages for ease of description.

As an illustrative example, assume that the interleave granularity is 1024 bytes (e.g., 1 kilo-byte (kB)), and a page in the system memory can store up to 4096 bytes (e.g., 4 kB) of data. In this example, to fill the page in an interleave manner, the MIF may cause MC0 to store a first 1 kB of data in section 0 of the page in memory unit 0, then cause MC1 to store a second 1 kB of data in section 1 of the page in memory unit 1, then cause MC0 to store a third 1 kB of data in section 2 of the page in memory unit 0, and then cause MC1 to store a fourth 1 kB of data in section 3 of the page in memory unit 1.

In examples where the system memory is not divided into pages, the MIF may still interleave storage based on the interleave granularity. For example, the MIF may cause MC0 to store a first 1 kB of data in the system memory, and then cause MC1 to store a second 1 kB of data in the system memory, and so on. For instance, the MIF may store the data in an interleaving manner using MC0 and MC1 in the system memory.

While storing data in an interleave manner may balance the storage responsibilities substantially between MC0 and MC1, there may not be equal balance in retrieving the data (e.g., the MIF stores equal amounts of data received from the GPU in memory unit 0 via MC0 and memory unit 1 via MC1, but the MIF may not retrieve equal amounts of data, for the GPU, from memory unit 0 via MC0 and memory unit 1 via MC1). As described in more detail, the GPU may perform a rasterization step in which the GPU divides a display into display tiles, retrieves the pixel values within the display tiles from the system memory, and render the pixels of the display based on the pixel values. Storing in an interleaving manner may result in the GPU subsequently retrieving pixel values from only memory unit 0 or memory unit 1, but not both memory unit 0 and memory unit 1.

For example, storing in an interleave manner may result in all of the pixel values for one display tile being stored in memory unit 0, and none in memory unit 1, or vice-versa. In this case, when the GPU requests to retrieve pixel values for a display tile, the MIF may only be able to use MC0 to retrieve the pixel values from memory unit 0, leaving MC1 idle, or vice-versa. In this example, retrieving pixel values for a display tile from only one memory unit of the system memory, and none from any other, may not be an efficient access of the system memory.

The techniques described in this disclosure may add padding bits to the system memory when storing in the interleave manner. For purposes of illustration, the techniques are described in terms of padding bytes, where one padding byte is equal to eight padding bits. The padding bytes may occupy additional storage locations within the system memory, as compared to examples where there are not padding bytes. However, the padding bytes may shift the manner in which the data is stored such that when the pixel values for pixels within a display tile are subsequently retrieved, the pixel values for that display tile are retrieved from both memory unit 0 and memory unit 1 via MC0 and MC1, respectively. Furthermore, with the padding bytes the GPU may be able to store data of the display tile in parallel, as discussed below.

For example, to retrieve pixel values for a display tile, the GPU may be able to request the MIF to retrieve the pixel values from both memory unit 0 and memory unit 1 via MC0 and MC1, respectively, at substantially a same time (e.g., in parallel). Accessing the pixel values at the same time using MC0 and MC1 may promote efficient access of the system memory. This may allow the GPU to retrieve greater amounts of pixel values per access to the system memory as compared to if the GPU could only access system memory from either MC0 or MC1, and not at the same time. In this manner, the techniques described in this disclosure may sacrifice storage space (e.g., due to the additional padding bytes) to achieve better access efficiency to the system memory.

Similarly, when storing pixel values of the display tile, the GPU may be able to request the MIF to store the pixel value from both memory unit 0 and memory unit 1 via MC0 and MC1, respectively, at substantially a same time (e.g., in parallel). Similar to the retrieval of pixel values, such parallel storage may promote efficient access to the system memory.

FIG. 1 is a block diagram illustrating an example of a device that may implement one or more aspects of this disclosure. For example, FIG. 1 illustrates device 10. Examples of device 10 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. As illustrated, device 10 may include integrated circuit (IC) 12 and system memory 24. Device 10 may include components in addition to those illustrated in FIG. 1, as illustrated in greater detail in FIG. 19.

IC 12 may include graphics processing unit (GPU) 14, processor 16, memory interface (MIF) 20, and memory controllers (MCs) 22A-22N (collectively referred to as MCs 22). Although FIG. 1 illustrates GPU 14 and processor 16 residing in a common package (e.g., a common hardware chip), aspects of this disclosure are not so limited. For example, processor 16 may be external to the package. Furthermore, in some examples where processor 16 is external to the package, GPU 14 may include MIF 20 and MCs 22; however, this is not a requirement in every example where processor 16 is external to the package.

In other words, in some examples, processor 16, GPU 12, MIF 20, and MCs 22A-2N may be individual hardware chips, and IC 12 may include the combination of these hardware chips. In other examples, one hardware chip may include one or more of processor 16, MIF 20, and MCs 22, and another hardware chip may include GPU 14, and in these examples, IC 12 may include both of these two hardware chips. Other such permutations and combinations may be possible, including the example illustrated in FIG. 1 where processor 16, GPU 14, MIF 20, and MCs 22 are illustrated to be in a common package. Moreover, IC 12 may include additional components than those illustrated in FIG. 1, such as a video coder.

IC 12 may be a specialized hardware unit designed for specific purposes such as rendering graphics with specific performance criteria such as massive parallel processing capabilities to render graphics in a relative quick fashion. In some instances, IC 12 may include specialized hardware in combination with a digital signal processor (DSP), a general purpose microprocessor, an application specific integrated circuit (ASIC), a field programmable gate array (FPGA), or other equivalent integrated or discrete logic circuitry. For example, GPU 14 may be specialized hardware, and processor 16 may be a DSP, a general purpose microprocessor, an ASIC, or an FPGA; although aspects of this disclosure should not be considered so limiting.

Examples of system memory 24 include, but are not limited to, a random access memory (RAM), a read only memory (ROM), an electrically erasable programmable read-only memory (EEPROM), flash memory, hard disk drive, or any other medium that can be used to store desired program code in the form of instructions or data structures and that can be accessed by processor 16 and GPU 14. In some examples system memory 24 may comprise one or more computer-readable storage media, such as a computer-readable storage device. For instance, in some example implementations, system memory 24 may include instructions that cause processor 16 and GPU 14 to perform the functions ascribed to each in this disclosure.

System memory 24 may, in some examples, be considered as a non-transitory storage medium. The term "non-transitory" may indicate that the storage medium is not embodied in a carrier wave or a propagated signal. However, the term "non-transitory" should not be interpreted to mean that system memory 24 is non-movable. As one example, system memory 24 may be removed from device 10, and moved to another device. As another example, a storage device, substantially similar to system memory 24, may be inserted into device 10. In certain examples, a non-transitory storage medium may store data that can, over time, change (e.g., in RAM).

GPU 14 may be configured to perform graphics related functions such as determining pixel values for pixels of a display of device 10, which may be part of device 10 or coupled to device 10, and render the pixels of the display. For example, processor 16 may execute an application, stored in system memory 24, such as a video game, a web browser, an e-mail application, or any other application that creates graphics that is to be presented. Processor 16 may instruct GPU 14 to perform graphics related functions to determine the pixel values such as color values, opacity values, and other such values for the graphics created by the execution of the application. In response, GPU 14 may perform the graphics related functions and render the pixels of the display based on the determined pixel values.

Graphics processing unit (GPU) driver 18 may function as the interface between processor 16 and GPU 14 that allows processor 16 to instruct GPU 14 to perform the graphics related functions. For example, when processor 16 needs to transmit a command or an instruction to GPU 14, it is through GPU driver 18 that processor 16 transmits the command or instruction. The commands or instructions that processor 16 may transmit to GPU 14 include commands to load and execute instructions of shader programs such as vertex shaders and fragment shaders, and commands such as virtual addresses with which GPU 14 may retrieve pixel values from or store pixel values into system memory 24. In this manner, processor 16 may control the functionality of GPU 14.

The virtual addresses that GPU 14 utilizes to retrieve or store pixel values may be part of a virtual memory scheme that keeps the actual locations of where the pixel values are stored or being retrieved from "hidden" from GPU 14. For example, virtual memory is a memory management technique that virtualizes system memory 24 so that GPU 14 may need only to refer to the virtual addresses for retrieving and storing pixel values. In these examples, GPU driver 18 of processor 16 may transmit the virtual addresses to GPU 14 that indicate to GPU 14 where to store the pixel values or from where to retrieve the pixel values.

As illustrated, GPU driver 18 is shown in dashed lines within processor 16. This is to illustrate that GPU driver 18 is software that is executing on processor 16. In this example, system memory 24 stores the source code or object code of GPU driver 18 that processor 16 retrieves for execution. Alternatively, GPU driver 18 may be hardware embedded within processor 16, or hardware external to processor 16 that couples to processor 16 and GPU 14. In general, GPU driver 18 may be hardware, software, firmware, or any combination thereof. For purposes of illustration and clarity, the examples described in this disclosure are described in context of GPU driver 18 being software executing on processor 16.

As indicated above, GPU 14 may store pixel values into and retrieve pixel values from system memory 24. For accessing system memory 24, GPU 14 may utilize memory interface (MIF) 20 and memory controllers (MCs) 22. MIF 20 and MCs 22 may be hardware, software, firmware, or any combination thereof. For purposes of illustration, MIF 20 and MCs 22 are described as being hardware.

Each one of MCs 22 may provide access to a corresponding one of memory units 26A-26N (collectively referred to as memory units 26) of system memory 24. Each one of memory units 26 may be distinct portions of system memory 24 that are separately accessible. For example, system memory 24 may include a plurality of memory units 26, and access to memory units 26 is provided by a corresponding one of MCs 22.

In some examples, one of memory units 26 may be accessible via only its corresponding one of MCs 22, and via no other MCs 22. For example, if MC 22A corresponds to memory unit 26A, then memory unit 26A may only be accessible via MC 22A, and MC 22B-22N may not be able to access memory unit 26A. In this way, each one of MCs 22 provides a channel to system memory 24 via corresponding memory units 26.

For purposes of illustration and clarity, aspects of this disclosure are described with IC 12 including two MCs 22 (e.g., MC 22A and MC 22N), and system memory 24 including two memory units 26 (e.g., memory unit 26A and memory unit 26N). However, aspects of this disclosure are not so limited. In alternate examples, IC 12 may include more than two MCs 22, and system memory 24 may include more than two memory units 26, and the techniques described in this disclosure may be extendable to such examples as well. In examples where system memory 24 includes two memory units, system memory 24 may be referred to as a dual-channel memory because there are two channels provided by two MCs 22 to system memory 24, respectively.

MIF 20 may be the interface that allows GPU 14 and processor 16 to access data (e.g., pixel values) from memory units 26A and 26N via MCs 22A and 22N, respectively. For example, MIF 20 may include a memory management unit (MMU) 21 that maps virtual memory addresses into physical memory addresses. For instance, to store pixel values into or retrieve pixel values from a particular memory address within system memory 24, GPU 14 may output a virtual address associated with the particular memory address to MIF 20. MMU 21 of MIF 20 may determine the particular memory address from the virtual memory address, and access the particular memory address in system memory 26.

The virtual memory space may be divided into a plurality of virtual pages. These virtual pages may be contiguous, but the physical pages in system memory 24 to which these virtual pages correspond may not be contiguous in system memory 24. Pages may be considered as the minimum units that MIF 20 may be able to manage.

Figure 2:
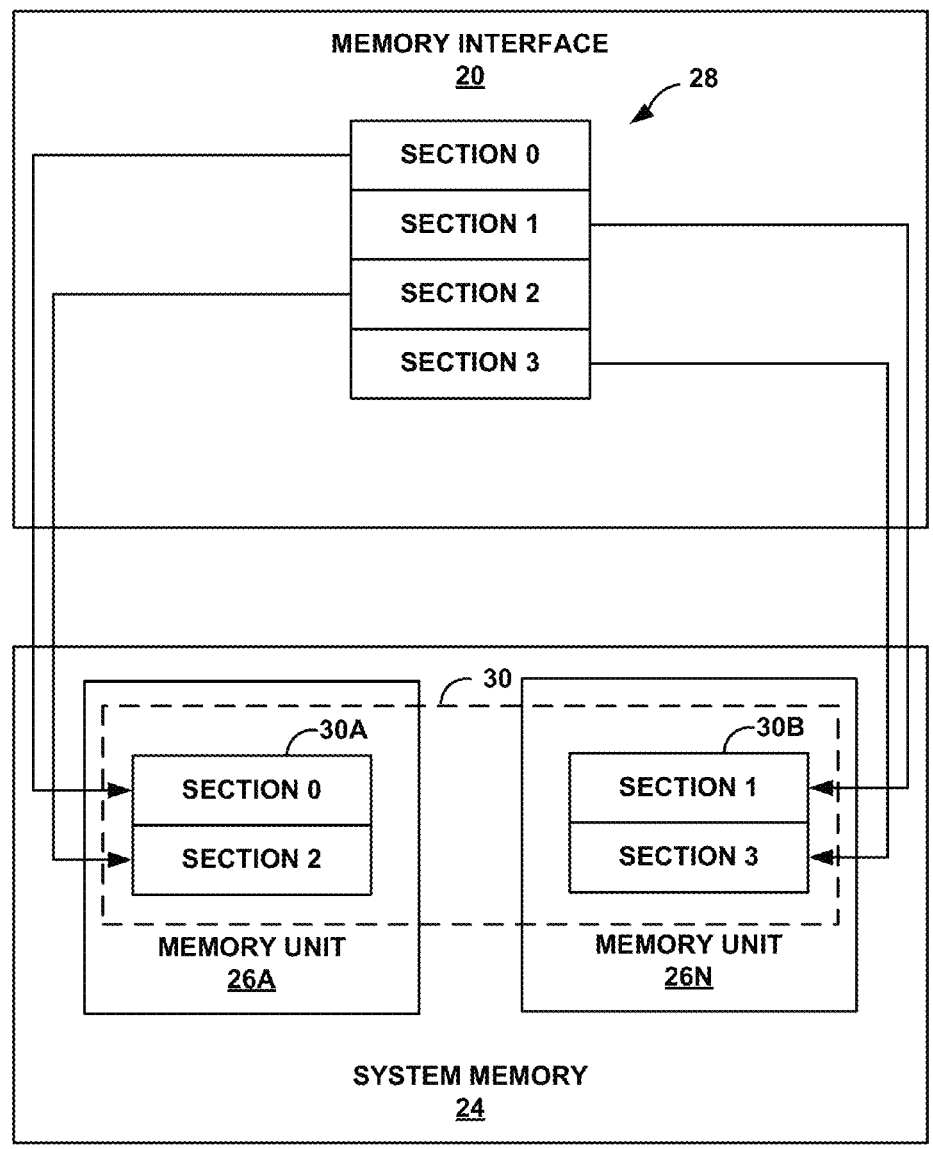
FIG. 2 is a conceptual diagram illustrating an example physical page of a system memory of FIG. 1.

In aspects of this disclosure, a physical page mapped from a virtual page may encompass both memory unit 26A and memory unit 26N, as illustrated in more detail in FIG. 2. FIG. 2 is a conceptual diagram illustrating an example physical page of system memory 24. For example, FIG. 2 illustrates memory interface (MIF) 20 including a virtual page 28 which includes four sections (sections 0-3). It should be understood that virtual page 28 is a virtual construct that is illustrated in FIG. 2 for ease of understanding. In FIG. 2, system memory 24 may include a physical page 30 that corresponds to virtual page 28.

Physical page 30 may encompass both memory unit 26A and memory unit 26N. For example, memory unit 26A may store a portion of physical page 30, indicated as portion 30A, and memory unit 26B may store a portion of physical page 30, indicated as portion 30B. As illustrated, memory unit 26A stores section 0 and section 2 of physical page 30, and memory unit 26N stores section 1 and section 3 of physical page 30.

Memory unit 26A may store section 0 and section 2, and memory unit 26N may store section 1 and section 3 because of IC 12 storing data in an interleaving manner. For instance, referring back to FIG. 1, GPU driver 18 may transmit instructions that cause GPU 14 to store pixel values, and may transmit the virtual addresses for where the pixel value are to be stored. GPU 14, in turn, may request MIF 20 to store the pixel values in accordance with the virtual addresses. MIF 20, in turn, may map the virtual addresses to physical addresses and store the pixel values in pages of system memory 24 in an interleaving manner based on the physical addresses.

MIF 20 may be configured to store the pixel values in an interleaving manner. As one example, MIF 20 may be preprogrammed to store the pixel values in the interleaving manner. As another example, MIF 20 may receive instructions that instruct MIF 20 to store the pixel values in the interleaving manner.

As part of the graphics related functions, GPU 14 may generate a surface of graphics image or content that is to be displayed on the display of device 10. GPU driver 18 may transmit instructions that cause GPU 14 to store the surface in system memory 24, and the virtual addresses as to where GPU 14 is to store the surface. Each surface may include pixel values that are stored in system memory 24.

In examples described in this disclosure, when GPU driver 18 transmits instructions, as one example, GPU driver 18 may transmit instructions directly to GPU 14 which cause GPU 14 to perform the instructed functions. As another example, GPU driver 18 may transmit an instruction that is stored in system memory 24. GPU driver 18 may then command GPU 14 to retrieve the stored instruction from system memory 24, and perform the instructed function. In either of these examples, it may be considered that GPU driver 18 transmits instructions that cause GPU 14 to perform the instructed functions.

The surfaces may be viewed as a two dimensional (2D) array of pixel values, and GPU 14 may store the surfaces in a linear or tiled fashion in system memory 24. In some examples, the 2D array of pixel values may be approximately the same size as the number of pixels on the display. For example, the pixel values of the surface may represent the graphics image generated by GPU 14.

As one example, GPU driver 18, executing on processor 16, may transmit instructions that cause GPU 14 to store each line of the surface, which is then stored in system memory 24, where a line encompasses pixel values across one row of the surface. As another example, GPU driver 18 may transmit instructions to cause GPU 14 to store each tile of the surface, referred to as surface tile, which is then stored in system memory 24, where a tile encompasses M×N pixel values of the surface. In general, this disclosure may generally refer to storing portions of a surface, which may refer to storing a surface in linear or tiled fashion.

In this example, to store the surface in either the linear or tiled fashion, GPU driver 18 may transmit instructions that cause GPU 14 to store the pixel values at virtual addresses. MMU 21 of MIF 20 may determine the physical addresses that correspond to the virtual addresses, and GPU 14 through MIF 20 may store the pixel values at the pages of system memory 24 that correspond to the physical addresses.

MIF 20 may interleave between MC 22A and MC 22N to store the pixel values in pages of system memory 24. The interleaving manner of storage refers to storing a first set of bytes, where one byte is eight bits, in memory unit 26A via MC 22A, followed by storing a second set of bytes in memory unit 26N via MC 22N, followed by storing a third set of bytes in memory unit 26A via MC 22A, followed by storing a fourth set of bytes in memory unit 26N via MC 22N, and so forth. In other words, the interleaved manner of storage may be considered as alternating the storage of bytes in memory unit 26A and memory unit 26N via respective MC 22A and 22N. The number of bytes that are stored per interleave cycle may be referred to as an interleave granularity, and may be defined by GPU driver 18 or MIF 20 may be preprogrammed with the interleave granularity.

For example, in the example illustrated in FIG. 2, physical page 30 (mapped from virtual page 28) may be able to store 4096 bytes of pixel values (e.g., 4 kilobytes (kB) of pixel values), which means that each one of sections 0-3 can store 1024 bytes of pixel values (e.g., 1 kB of pixel values). Also, assume that the interleave granularity is 1024 bytes. In this example, GPU driver 18 may cause GPU 14 to store the pixel values through MIF 20 such that a first 1 kB of pixel values of a line or tile of the surface is stored in section 0 in memory unit 26A via MC 22A, and such that a second 1 kB of pixel values of the line or tile of the surface is stored in section 1 in memory unit 26N via MC 22N, due to the interleave granularity of 1 kB. Also, GPU driver 18 may instruct cause GPU 14 to store the pixel values through MIF 20 such that a third 1 kB of pixel values of the line or tile of the surface is stored in section 2 in memory unit 26A via MC 22A, and such that a fourth 1 kB of pixel values of the line or tile of the surface is stored in section 3 in memory unit 26N via MC 22N, due to the interleave granularity of 1 kB.

Although the above example describes storage of pixel values in pages (e.g., physical page 30 or virtual page 28), aspects of this disclosure are not so limited. For example, it may not be necessary that system memory 24 is divided into a plurality of physical pages. Even in these examples, GPU driver 18 may cause GPU 14 to store pixel values through MIF 20 in the interleaving manner. In these examples, the storage bits within system memory 24 may be considered as a contiguous storage locations; however, contiguous storage may not be necessary in every example. As an example where system memory 24 is not necessarily divided into physical pages, GPU driver 18 may cause GPU 14 to store the pixel values through MIF 20 such that a first 1 kB of pixel values of a line or tile of the surface is stored in memory unit 26A via MC 22A, and such that a second 1 kB of pixel values of the line or tile of the surface is stored in memory unit 26N via MC 22N, due to the interleave granularity of 1 kB. Also, GPU driver 18 may cause GPU 14 to store pixel values through MIF 20 such that a third 1 kB of pixel values of the line or tile of the surface is stored in memory unit 26A via MC 22A, and such that a fourth 1 kB of pixel values of the line or tile of the surface is stored in memory unit 26N via MC 22N, due to the interleave granularity of 1 kB. For ease of description, various examples are described with examples where system memory 24 includes pages such as physical page 30.

For purposes of illustration, this disclosure describes storing bytes of pixel values. A byte is equal to 8 bits. Accordingly, storing 1024 bytes is equivalent to storing 8192 bits, where a bit may be a digital value of 0 or a digital value of 1. Therefore, although this disclosure describes storing bytes of pixel values, the techniques described in this disclosure are equivalent to storing bits of pixel values, where each byte is 8 bits.

In the example where system memory 24 includes physical page 30, the interleave granularity causes the half of the physical page 30 to be stored in memory unit 26A and the other half of the physical page 30 to be stored in memory unit 26B. Such interleave storage may promote efficient channel utilization. For example, the interleave granularity may cause MIF 20 to store half the pixel values using the channel established by MC 22A, and store half the pixel values using the channel established by MC 22N. Such storage of half the pixel values using the channel established by MC22A and half the pixel values using the channel established by MC22N may occur even in examples where system memory 24 is not divided into pages.

Also, storing pixel values in the interleave storage manner may allow GPU 14 to store pixel values in system memory 24 in parallel. For example, GPU 14 may be able to store pixel values in section 0 of portion 30A of physical page 30 within memory unit 26A via MC 22A at the same time (e.g., in parallel) that GPU 14 may be able to store pixel values in section 1 of portion 30B of physical page 30 within memory unit 26N via MC 22N. Similar to above, the storage of pixel values within memory unit 26A via MC22A occurring at the same time as the storage of pixel values within memory unit 26N via MC 22N may also occur even in examples where system memory 24 is not divided into pages.

However, as described in more detail, retrieving pixel values that have been stored in the interleave storage manner may not efficiently utilize the channels to system memory 24 established by MC 22A and MC 22N. For example, one of the functions of GPU 14 is to render the final pixel values on the display of device 10 for presentation. For instance, after the surface is stored in system memory 24, GPU 14 retrieves the pixel values of the surface from system memory 24 to display the pixels on the display of device 10. The pixel values represent the graphics content or image that is to be displayed by the display.

In some examples, GPU 14 renders the display piece by piece, in a process referred to as rasterization. In rasterization, GPU 14 divides the display into a plurality of display tiles. GPU 14 then renders the graphics content for one display tile, then the next display tile, and so forth to render the final image on the display.

Each display tile may be a rectangular area of the display. For example, each display tile includes W×H pixels, where W is the width of the display tile, and H is the height of the display tile in pixels. The display tiles may be 16×16, 8×4, 8×8, 16×4, 16×8, 32×4, 32×8, 4×8, 4×16, 8×16, 4×32, or 8×32. However, aspects of this disclosure are not so limited, and in general any sized display tile is contemplated by the techniques described in this disclosure, including non-rectangular display tiles.

Display tiles and storing a surface in tiled fashion (e.g., storing a surface tile) should not be confused. Display tiles are portions of the display for which GPU 14 renders the graphics content. To store a surface in tiled fashion means storing pixel values for the surface tiles in system memory 24. In other words, display tiles refer to tiles on the display, and surface tiles refer to tiles within the surface that is to be displayed. To ease with understanding, assume that the size of each display tile is 16×16, and the size of each surface tile is 4×4. The size of 16×16 for the display tile and the size of 4×4 for the surface tile are selected so that the size of the display tile and the size of the surface tile are different to avoid confusing display tile and surface tile. In alternate examples, it may be possible for the display tile and the surface tile to be of the same size, or sizes different than 16×16 and 4×4.

FIGS. 3A and 3B are conceptual diagrams that illustrate examples of storing pixel values in a linear and tiled fashion. FIG. 3A illustrates surface 32A and FIG. 3B illustrates surface 32B. Surface 32A and 32B may include pixel values such as color values or texture values for corresponding pixels on the display of device 10. For example, surface 32A and surface 32B each include h by w pixel values, where h is the height of surface 32A and surface 32B and w is the width of surface 32A and surface 32B. In some examples, the height and width of surface 32A and surface 32B may be substantially similar to the height and width of the display of device 10. For example, the display of device 10 may include h by w pixels, and each one of the pixel values of surface 32A and 32B may be pixel values for a corresponding pixel of the display of device 10.

In FIG. 3A, surface 32A includes h lines, and GPU 14 may store the pixel values in each of the h lines from top to bottom, and starting from left end of the line to the right end of the line in the pages of system memory 24 utilizing the interleave storage technique described above. Storing pixel values in the manner described with respect to FIG. 3A may be referred to as storing pixel values in a linear fashion. For example as illustrated in FIG. 3A, GPU 14 may store pixel values for line 0 in a first portion of virtual memory 28, store pixel values for line 1 in a second portion of virtual memory 28, and so forth. As discussed above, the portions of the virtual memory 28 may be contiguous. MIF 20 may then store the pixel values into memory unit 26A and memory unit 26N of system memory 24 via MC 22A and MC 22N.

In FIG. 3B, surface 32B includes X number of surface tiles, where each surface tile is M×N in size. For example, each surface tile corresponds to M×N pixels on the display of device 10. GPU 14 may store the M×N pixel values in each surface tile starting from the top-left surface tile (e.g., the 0) and ending with bottom-right surface tile (e.g., the X−1). Storing pixel values in the manner described with respect to FIG. 3B may be referred to as storing pixel values in a tiled fashion. For example, as illustrated in FIG. 3B, GPU 14 may store pixel values for surface tile 0 in a first portion of virtual memory 28, store pixel values for surface tile 1 in a second portion of virtual memory 28, and so forth. Similar to FIG. 3A, the portions of the virtual memory 28 may be contiguous. Also, similar to FIG. 3A, in FIG. 3B, MIF 20 may then store the pixel values into memory unit 26A and memory unit 26N of system memory 24 via MC 22A and MC 22N.

In some instances, storing pixel values in a linear fashion may be considered as a special case of storing pixel values in a tiled fashion. For example, assume that the size of a surface tile is w by 1 (e.g., M equals w, and N equals 1). In this example, the size of the surface tile is the same as the size of a line of surface 32A, and storing pixel values in a tiled fashion may be the same as storing pixel values in a linear fashion, in this example. In general, this disclosure may generally refer to storing portions of a surface (e.g., surface 32A or surface 32B), which may refer to storing a surface in linear or tiled fashion.

When GPU 14 generates the pixel values for the surface (e.g., the image or graphics content that is to be displayed on the display of device 10), GPU 14 may request to store of the pixel values in linear fashion or tiled fashion, and MIF 20 may then store the pixel values in an interleaving manner based on the interleave granularity to efficiently utilize the channels to system memory 24 provided by MC 22A and MC 22N. However, when GPU 14 requests to retrieve the pixel values from system memory 24, MIF 20 may not efficiently utilize the channels to system 24 provided by MC 22A and MC 22N when the surface is stored in linear or tiled fashion.

For example, the display of device 10 may include a right-half and a left-half. As illustrated in more detail in FIGS. 4-7, when GPU 14 stores the pixel values in linear or tiled fashion, MIF 20 may retrieve all of the pixel values that correspond to the left-half of the display using only MC 22A, and none from MC 22N. Similarly, MIF 20 may retrieve all of the pixel values that correspond to the right-half of the display using only MC 22N, and none from MC 22A. In this way, when GPU 14 renders a display tile that is in the left-half of the display, GPU 14 may receive the pixel values only from MC 22A, leaving the channel established by MC 22N idle, which may be inefficient usage of the channels to system memory 24. Similarly, when GPU 14 renders a display tile that is in the right-half of the display, GPU 14 may receive pixel values only from MC 22N, leaving the channel established by MC 22A, which may also be inefficient usage of the channels to system memory 24.

Figure 3C:
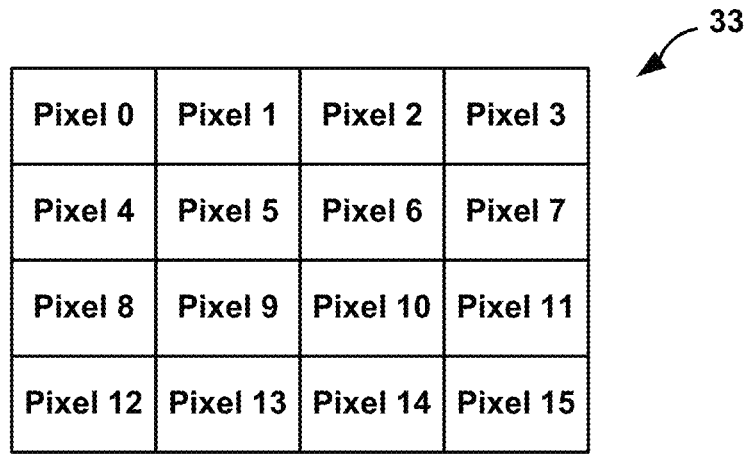
FIG. 3C is a conceptual diagram illustrating an example of a surface tile.
Figure 3D:
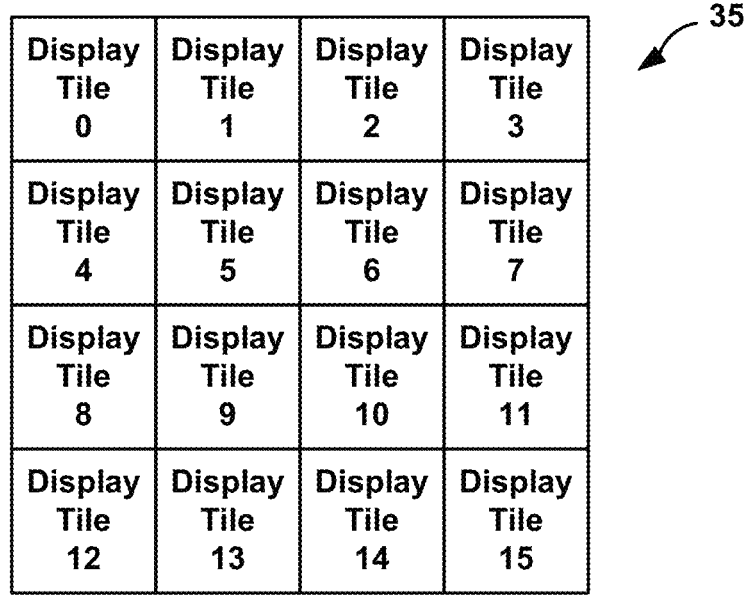
FIG. 3D is a conceptual diagram illustrating example display tiles.

FIG. 3C is a conceptual diagram illustrating an example of a surface tile. For example, FIG. 3C illustrates a 4×4 surface tile 33 that includes a total of 16 pixels in a tile. FIG. 3D is a conceptual diagram illustrating example display tiles. For example, FIG. 3D illustrates a display 35 that includes sixteen display tiles (e.g., display tiles 0-15). As one example, each display tile may include 16×16 pixels. In other words, display tile 0 may include 16×16 pixels, display tile 1 may include 16×16 pixels, and so forth. In this example, display 35 may include 64×64 pixels (i.e., 16 horizontal pixels per display tile*4 display tiles equals 64 horizontal pixels, and 16 vertical pixels per display tile*4 display tiles equals 64 vertical pixels for a total of 64×64 pixels).

Figure 4:
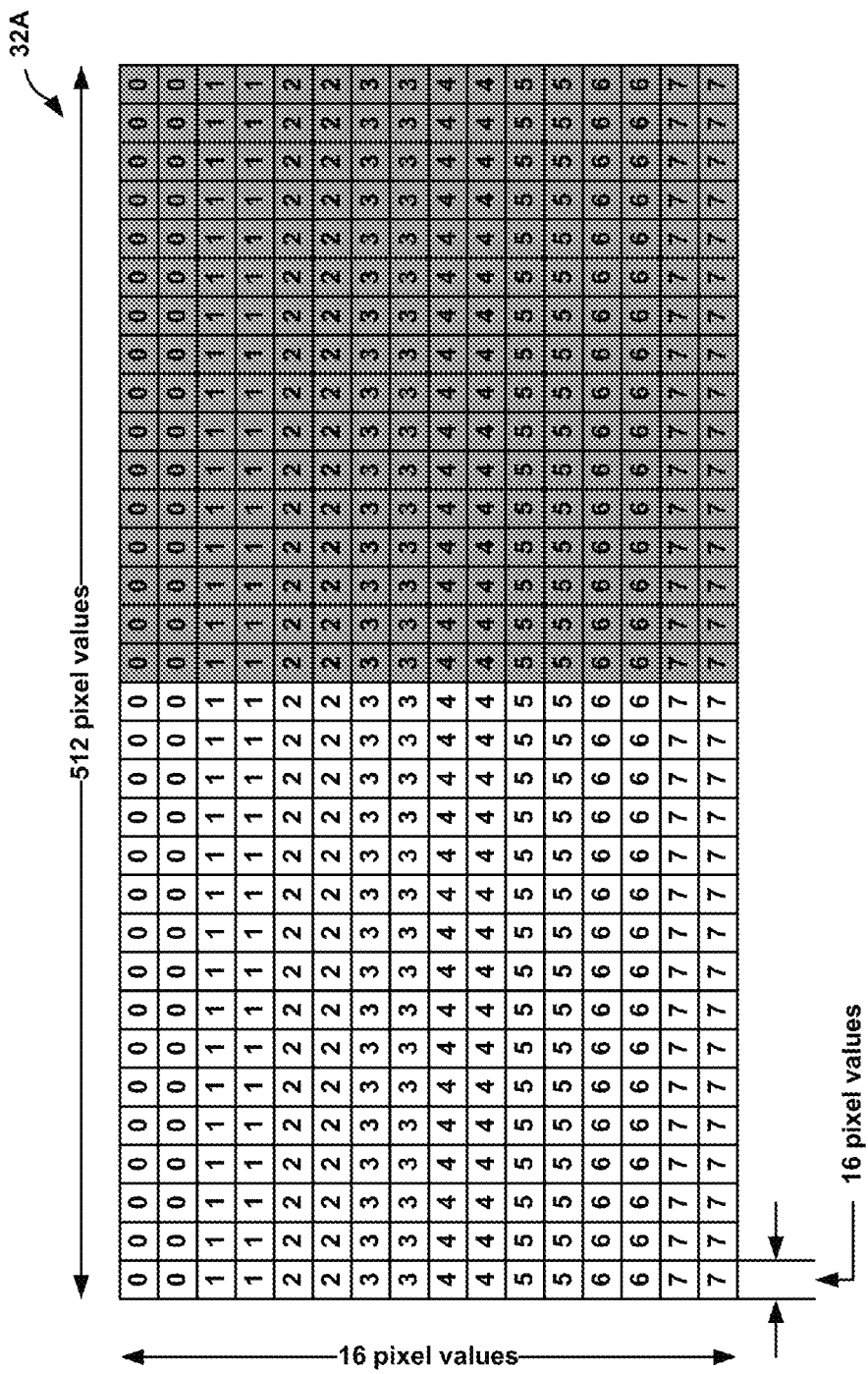
FIG. 4 is a graphical diagram illustrating storage of a surface in system memory in a linear fashion.

FIG. 4 is a graphical diagram illustrating storage of a surface in system memory in a linear fashion. For example, as described above with respect to FIG. 3A, MIF 20 may store the pixel values of surface 32A, generated by GPU 14, in a linear fashion in system memory 24. FIG. 4 illustrates the results of the storage of the pixel values of surface 32A in system memory 24. In FIG. 4, assume that the width of the display of device 10 is 512 pixels and the height is 16 pixels. Accordingly, the width (w) of surface 32A is 512 pixel values, and the height (h) of surface 32A is 16 pixel values because the size of surface 32A may be the same as the size of the display of device 10. To ease with illustration, each column in FIG. 4 represents 16 pixel values. Therefore there are 32 columns that each represent 16 pixel values for a total width of 512 pixel values (i.e., 16*32 equals 512).

Also, in the example of FIG. 4, assume that the each pixel value encompasses 4 bytes of data. For example, each pixel value may represent a red-green-blue (RGB) color value and an opacity value. In this example, the red value may encompass 8 bits, the green value may encompass 8 bits, the blue value may encompass 8 bits, and the opacity value may encompass 8 bits, for a total of 32 bits, which is 4 bytes (i.e., 32 bits divided 8 bits per byte). Therefore, there are a total of 2048 bytes across each row (i.e., 512 pixel values*4 bytes per pixel value). Again, for ease of description, the techniques are described with respect to bytes of pixel values; however, the techniques may be considered with respect to bits of pixel values where each byte is 8 bits.

The numerical values 0-7 in FIG. 4 indicate which page in system memory 24 stores the pixel values for surface 32A. For example, each page may be able to store 4096 bytes, and each row in FIG. 4 represents 2048 bytes of pixel values (i.e., 512 pixel values*4 bytes per pixel value). Therefore, pixel values for two lines can be stored in one page (i.e., 2048*2 equals 4096). Accordingly, in FIG. 4, the numerical value 0 in the first two rows means that 4096 bytes of pixel values in first two lines of surface 32A are stored in page 0, the numerical value 1 in the next two rows means that the 4096 bytes of pixel values in the second two lines of surface 32A are stored in page 1, and so forth. The numerical value 7 in the last two rows means that the 4096 bytes of pixel values in the last two lines of surface 32A are stored in page 7.

As illustrated in FIG. 4, the left-half of surface 32A is presented in white background and the right-half of surface 32A is presented with a gray background. The different colored backgrounds illustrate which one of memory unit 26A and 26N was used to store surface 32A. For example, the pixel values in the left-half of surface 32A (i.e., in the white background) are stored in memory unit 26A in system memory 24 via MC 22A, and the pixel values in the right-half of surface 32A (i.e., in the gray background) are stored in memory unit 26N in system memory 24 via MC 22N. The following describes why this is the case in FIG. 4.

To reiterate, similar to the above examples, the interleave granularity is 1024 bytes, and each line of surface 32A includes 2048 bytes. Therefore, in this example, GPU driver 18 may transmit instructions that cause GPU 14 to store pixel values such that MIF 20 first stores 1024 bytes of the pixel values in page 0 via memory unit 26A and MC 22A, then stores the next 1024 bytes of the pixel values in page 0 via memory unit 26N and MC 22N due to the interleaving between memory unit 26A and memory unit 26N with an interleave granularity of 1024 bytes. Also, because each pixel value is 4 bytes, 1024 bytes equals 256 pixel values (i.e., 1024 divided by 4 equals 256). Therefore, if the first line of surface 32A in FIG. 4 is considered, then MIF 20 would store the first 1024 bytes of the pixel values, which would be for the first 256 pixel values in the first line of surface 32A, in page 0 via memory unit 26A and MC 22A. Then, MIF 20 would store the second 1024 bytes, which be for the next 256 pixel values in the first line of surface 32A, in page 0 via memory unit 26N and MC 22N due to the interleaving between memory unit 26A and memory unit 26N with an interleave granularity of 1024 bytes.

Because 256 pixel values is half of 512 pixel values, the pixel values in the first half of the first line of surface 32A would be stored in system memory 24 via memory unit 26A and MC 22A (hence the white background), and the pixels in the second half of the first line of surface 32A would be stored in system memory 24 via memory unit 26N and MC 22N (hence the gray background). The same result would occur for the second line of pixel values of surface 32A, and then page 0 would be full. Next, as illustrated in FIG. 4, the pixel values for the third line of surface 32A would be stored in page 1. For the same reasons described above with respect to the first line, the pixel values for the first half of the third line of surface 32A would be stored in page 1 via memory unit 26A and MC 22A (hence the white background), and the second half of the third line of surface 32A would be stored in page 1 via memory unit 26N and MC 22N (hence the gray background).

Furthermore, as described above, the size of surface 32A may be the same as the size of the display of device 10.

Therefore, the left-half of surface 32A corresponds to pixels on the left-half of the display of device 10, and the right-half of surface 32A corresponds to the pixels on the right-half of the display of device 10.

As described above, GPU 14 renders the pixel values stored in system memory 24 in a process referred to as rasterization. For example, GPU 14 divides the display of device 10 into display tiles, and renders the pixel values for the pixels within one display tile, then the next display tile, and so forth to render the final image on the display of device 10. For purposes of illustration, assume that a display tile is 16×16 pixels. Accordingly, in FIG. 4, one display tile corresponds to one column of surface 32A. For instance, as described above, each column is 16 pixel values wide, and the height of each column is 16 pixel values. Therefore, each column of surface 32A represents 16×16 pixels of the display of device 10. Because a display tiles is 16×16 pixels, each column of surface 32A represents pixel values for one display tile.

When GPU 14 requests MIF 20 to retrieve the pixel values for one display tile (e.g., one column of surface 32A in FIG. 4) from system memory 24, MIF 20 would retrieve this display tile from only memory unit 26A via MC 22A or memory unit 26N via MC 22N, but not both. For example, when GPU 14 receives pixel values for a first display tile (e.g., the first column in FIG. 4), MIF 20 would retrieve the pixel values from memory unit 26A via MC 22A, and not from memory unit 26N via MC 22N because all of the pixel values for the first column of surface 32A were stored in memory unit 26A of system memory 24 via MC 22A (e.g., as illustrated, the first column of surface 32A is with white background). Similarly, when GPU 14 receives the pixel values of the last display tile (e.g., the last column in FIG. 4), MIF 20 would retrieve the pixel values from memory unit 26N via MC 22N, and not memory unit 26A via MC 22A because of the pixel values for the last column in FIG. 4 were stored in memory unit 26N of system memory 24 via MC 22N (e.g., as illustrated, the last column of surface 32A is with gray background).

This retrieval may be an inefficient usage of system memory 24. For instance, in the example of FIG. 4, GPU 14 would not be able to receive pixel values for a display tile in parallel from memory unit 26A and memory unit 26N because MIF 20 may retrieve pixel values for each display tile only from either memory unit 26A or memory unit 26N, but not from both. This results in limiting the rate at which GPU 14 can render the pixels on the display because it limits the rate at which MIF 20 can retrieve pixels of a display tile.

Although the previous examples describe examples where the pixel values are color values to render the surface, aspects of this disclosure are not so limited. In other examples, the techniques of this disclosure may be extendable to examples where GPU 14 reads texture values from memory unit 26A and memory unit 26N.

Figure 5:
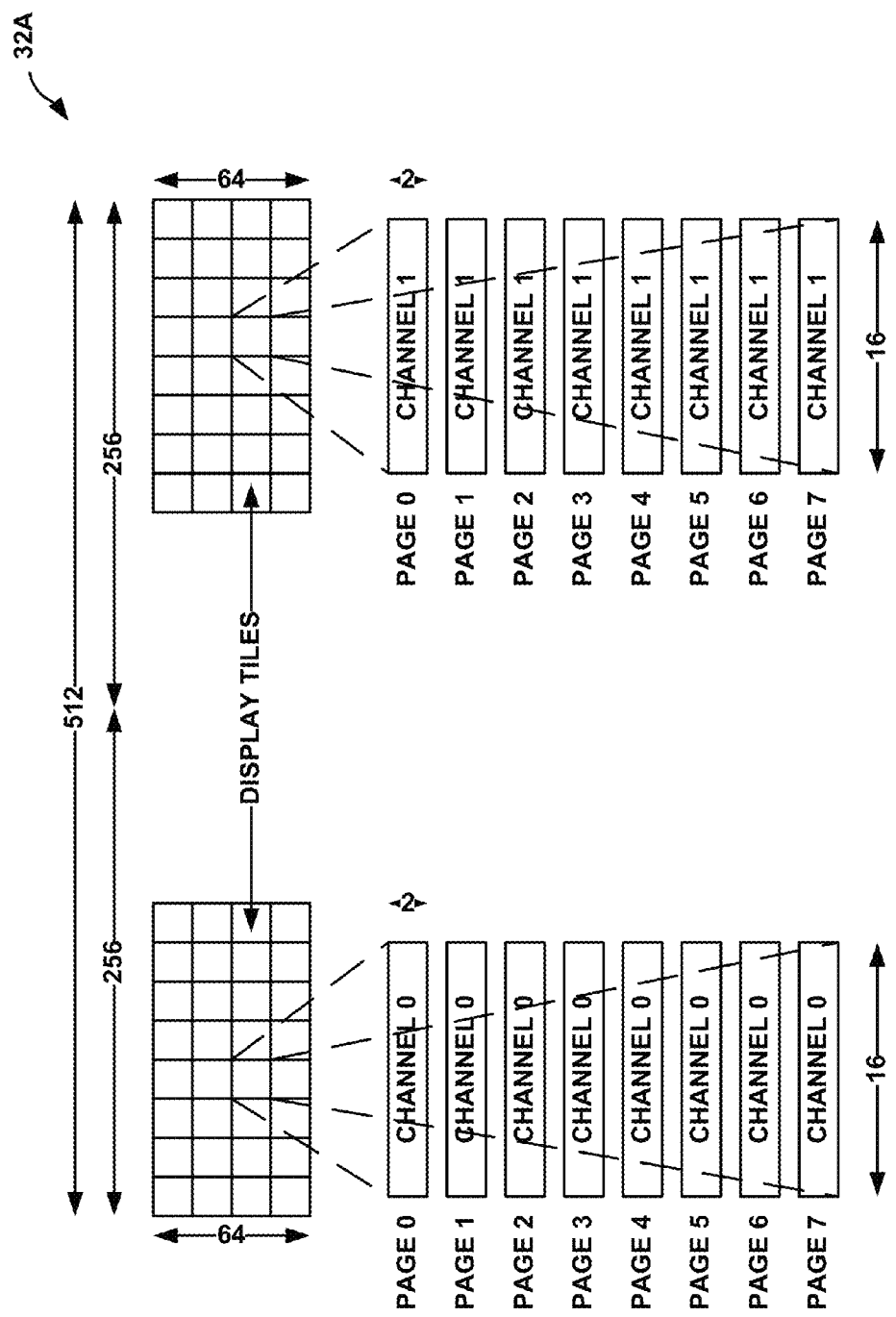
FIG. 5 is a graphical diagram illustrating storage of display tiles in system memory when the surface is stored in a linear fashion.

FIG. 5 is a graphical diagram illustrating storage of display tiles in system memory when the surface is stored in a linear fashion. For example, FIG. 5 illustrates the results of FIG. 4 from the perspective of the display. For instance, FIG. 5 illustrates which memory channel was used to store the pixel values for two of the display tiles when surface 32B is stored in a linear fashion.

As illustrated in FIG. 5, all of the pixel values for a display tile in the left half of the display are stored in pages 0-7 of system memory 24 via channel 0, and all of the pixel values for a display tile in the right half of the display are stored in pages 0-7 of system memory 24 via channel 1. In this example, channel 0 refers to storing pixel values in memory unit 26A via MC 22A, and channel 1 refers to storing pixel values in memory unit 26N via MC 22N.

For instance, as described above with respect to FIG. 4, all of the pixel values of the display tiles in the left half may be stored in pages 0-7 of memory unit 26A via MC 22A. FIG. 5 illustrates this by indicating that for a display tile in the left half, the pixel values for that display tile are stored in pages 0-7 of memory unit 26A via MC 22A (i.e., channel 0). Also, as described above with respect to FIG. 4, all of the pixel values of the display tiles in the right half may be stored in pages 0-7 of memory unit 26N via MC 22N. FIG. 5 illustrates this by indicating that for a display tile in the right half, the pixel values for that display tile are stored in pages 0-7 of memory unit 26N via MC 22N (i.e., channel 1).

Also, as described above with respect to FIG. 4, one display tile may be 16 pixels wide, which is illustrated in FIG. 5 with value of 16 that extends the width of the expanded display tile. The value of 2 illustrated in FIG. 5 indicates that one page may store two rows of a display tile. For example, as described above with respect to FIG. 4, the first two rows of surface 32A may be stored in page 0, which is indicated by the value of 2 in FIG. 5.

Figure 6:
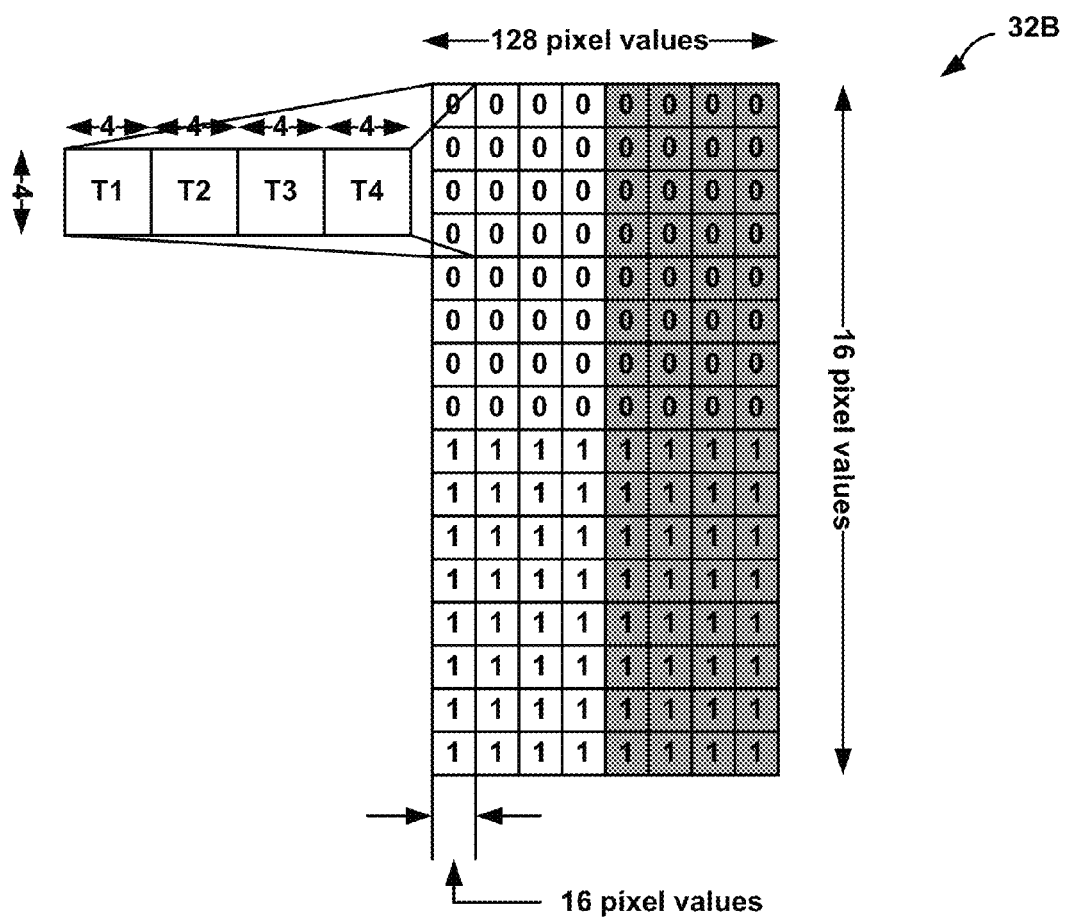
FIG. 6 is a graphical diagram illustrating storage of a surface in system memory in a tiled fashion.
Figure 7:
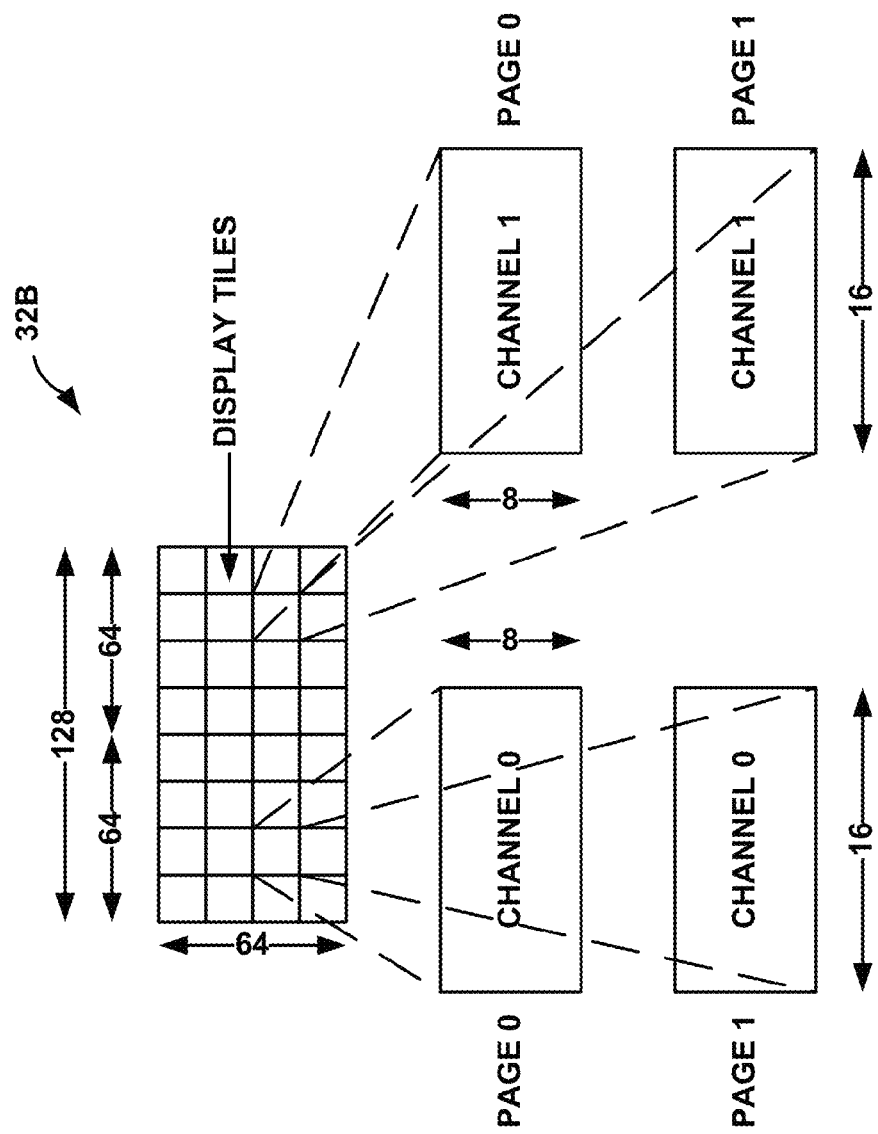
FIG. 7 is a graphical diagram illustrating storage of display tiles in system memory when the surface is stored in a tiled fashion.

Furthermore, although FIGS. 4 and 5 illustrate examples where the surface is stored in system memory 24, in linear fashion, a similar result may occur when the surface is stored in system memory 24 in tiled fashion. FIGS. 6 and 7 illustrate this in greater detail.

FIG. 6 is a graphical diagram illustrating storage of a surface in system memory in a tiled fashion. For example, as described above with respect to FIG. 3B, MIF 20 may store the pixel values of surface 32B, generated by GPU 14, in a tiled fashion in system memory 24. FIG. 6 illustrates the results of the storage of the pixel values of surface 32B in system memory 24. In FIG. 6, assume that the width of the display of device 10 is 128 pixels and the height is 16 pixels. Accordingly, the width (w) of surface 32B is 128 pixel values, and the height (h) of surface 32B is 16 pixel values because the size of surface 32B may be the same as the size of the display of device 10. As with FIG. 4, each column in FIG. 6 represents 16 pixel values. Therefore there are 8 columns that each present 16 pixel values for a total width of 128 pixel values (i.e., 16*8 equals 128).

Also, in the example of FIG. 6, assume that the each pixel value encompasses 4 bytes of data. The numerical values 0 and 1 in FIG. 6 indicate which page in system memory 24 stores the pixel values for surface 32B. For example, each page may be able to store 4096 bytes, and each row in FIG. 6 represents 512 bytes of pixel values (i.e., 128 pixel values*4 bytes per pixel value). Therefore, pixel values for eight rows can be stored in one page (i.e., 512*8 equals 4096). Accordingly, in FIG. 6, the numerical value 0 in the first eight rows means that 4096 bytes of pixel values in first eight rows of surface 32B are stored in page 0, the numerical value 1 in the next eight rows means that the 4096 bytes of pixel values in the next eight rows of surface 32B are stored in page 1.

For example, for storage, assume that each surface tile of surface 32B is a 4×4 surface tile. FIG. 6 illustrates the first four rows and the first column expanded to illustrate the four 4×4 surface tiles (e.g., tiles T1, T2, T3, and T4). For example, because each column is 16 pixel values wide, one column of surface 32B represents the width of the four tiles T1, T2, T3, and T4 that are each 4 pixel values wide. Also, because each row is one pixel value in length, four rows of surface 32B represent the length of one tile (e.g., one of T1, T2, T3, and T4).

In the example of FIG. 6, if a surface tile is 4×4 pixel values, and each pixel value is 4 bytes, then each surface tile includes 64 bytes (i.e., 4*4*4 bytes per pixel value equals 64 bytes). Therefore, in FIG. 6, four rows and one column, in surface 32B, include 256 bytes (64 bytes per tile*4 tiles for every four rows and one column equals 256 bytes). Furthermore, four rows and four columns, in surface 32B, then includes 1024 bytes (e.g., 256 bytes for four rows and columns*4 columns equals 1024 bytes). In the example of FIG. 6, four rows and four columns of surface 32B represent 64×4 pixel values, which includes 1024 bytes (i.e., 64*4*4 bytes per pixel value equals 1024 bytes).

Accordingly, when storing surface 32B in tiled fashion, MIF 20 may store the first 64×4 pixel values (e.g., the block in FIG. 5 that includes rows 1-4 and columns 1-4) in page 0 in memory unit 26A via MC 22A, then store the next 64×4 pixel values (e.g., the block in FIG. 6 that includes rows 1-4 and the columns 5-8) in page 0 in memory unit 26N via MC 22N. This would be the case because 64×4 pixel values are 1024 bytes, and the interleave granularity is 1024 bytes.

As illustrated, the first 64×4 pixel values include the numerical value 0 to indicate that these pixel values are stored in page 0, and are with white background to indicate that these pixel values are stored in memory unit 26A via MC 22A. Also the next 64×4 pixel values (e.g., the block that includes the rows 1-4 and columns 5-8) include the numerical value 0 to indicate that these pixel values are stored in page 0, and are with gray background to indicate that these pixel values are stored in memory unit 26N via MC 22N. Therefore, a block of surface 32B that includes four rows and eight columns includes 2048 bytes. For example, four rows and eight columns of surface 32B represent 128×4 pixel values, 128*4*4 bytes per pixel value equals 2048 bytes.

For reasons similar to those described above, MIF 20 may store the next 64×4 pixel values, generated by GPU 14 (e.g., the block that includes rows 5-8 and columns 1-4), in page 0 in memory unit 26A via MC 22A, and the 64×4 pixel values after that (e.g., the block that includes rows 5-8 and the columns 5-8) in page 0 in memory unit 26N via MC 22N, as indicated by the respective white and gray backgrounds. In this example, after MIF 20 stores the block that includes rows 1-8 and columns 1-8, page 0 may be full because page 0 may store a total of 4096 bytes.

Then, MIF 20 may store the block of surface 32B that includes rows 9-16 and columns 1-8, generated by GPU 14, in page 1 of memory unit 26A and memory unit 26N via MC 22A and MC 22N as indicated with the white and gray backgrounds. For example, MIF 20 may store the pixel values of surface 32B in the block that includes row 9-12 and column 1-4, as generated by GPU 14, in page 1 of memory unit 26A via MC 22A, and store the pixel values of surface 32B in the block that includes row 9-12 and column 5-8 in page 1 of memory unit 26N via MC 22N due to the interleave granularity of 1024 bytes. The same applies to the pixel values of surface 32B in the block that includes rows 13-16 and column 1-4, and the block that includes rows 13-16 and column 5-8.

The tile storage scheme described with respect to FIG. 6 may be inefficient when GPU 14 subsequently receives the pixel values for reasons similar to those described above with respect to FIG. 4. For example, for rasterization, GPU 14 may divide the display of device 10 into display tiles of 16×16 pixels. Similar to FIG. 4, in FIG. 6, one full column corresponds to one display tile. In FIG. 6, when GPU 14 receives pixel values for a first display tile, MIF 20 may retrieve pixel values for the first display tile (e.g., the first column in FIG. 6) from memory unit 26A via MC 22A, and not from memory unit 26N via MC 22N because all of the pixel values for the first column of surface 32B were stored in memory unit 26A of system memory 24 via MC 22A. Similarly, when GPU 14 receives pixel values for the last display tile (e.g., the last column in FIG. 6), MIF 20 may retrieve the pixel values from memory unit 26N via MC 22N, and not memory unit 26A via MC 22A because of the pixel values for the last column in FIG. 6 were stored in memory unit 26N of system memory 24 via MC 22N.

Similar to FIG. 4, in the example of FIG. 6, GPU 14 would not be able to receive pixel values for a display tile in parallel from memory unit 26A and memory unit 26N because MIF 20 may be able to retrieve pixel values for each display tile only from either memory unit 26A or memory unit 26N, but not from both. This results in limiting the rate at which GPU 14 can render the pixels on the display.

FIG. 7 is a graphical diagram illustrating storage of display tiles in system memory when the surface is stored in a tiled fashion. For example, FIG. 7 illustrates the results of FIG. 6 from the perspective of the display. For instance, FIG. 7 illustrates which memory channel was used to store the pixel values for two of the display tiles when surface 32B is stored in a tiled fashion.

As illustrated in FIG. 7, similar to FIG. 5, all of the pixel values for a display tile in the left half of the display are stored in pages 0 and 1 of system memory 24 via channel 0, and all of the pixel values for a display tile in the right half of the display are stored in pages 0 and 1 of system memory 24 via channel 1. Similar to FIG. 5, in this example, channel 0 refers to storing pixel values in memory unit 26A via MC 22A, and channel 1 refers to storing pixel values in memory unit 26N via MC 22N.

For instance, as described above with respect to FIG. 6, all of the pixel values of the display tiles in the left half may be stored in pages 0 and 1 of memory unit 26A via MC 22A. FIG. 7 illustrates this by indicating that for a display tile in the left half, the pixel values for that display tile are stored in pages 0 and 1 of memory unit 26A via MC 22A (i.e., channel 0). Also, as described above with respect to FIG. 6, all of the pixel values of the display tiles in the right half may be stored in pages 0 and 1 of memory unit 26N via MC 22N. FIG. 7 illustrates this by indicating that for a display tile in the right half, the pixel values for that display tile are stored in pages 0 and 1 of memory unit 26N via MC 22N (i.e., channel 1).

Also, as described above with respect to FIG. 6, one display tile may be 16 pixels wide, which is illustrated in FIG. 7 with value of 16 that extends the width of the expanded display tile. The value of 8 illustrated in FIG. 7 indicates that one page may store eight rows of a display tile. For example, as described above with respect to FIG. 6, the eight rows of surface 32A may be stored in page 0, which is indicated by the value of 8 in FIG. 7.

FIGS. 4-7 illustrate examples where MIF 20 may not efficiently utilize the channels to system memory 24 when retrieving pixel values for rasterization by GPU 14. For instance, in the examples described with respect to FIGS. 4-7, there may be poor channel load balance between memory unit 26A and memory unit 26N when retrieving pixel values for one display tile because MIF 20 may retrieve the pixel values for one display tile from either memory unit 26A or memory unit 26N, but not both. This poor channel load balance may result in low memory utilization (e.g., an inability of MIF 20 to retrieve pixel values for a display tile from both memory unit 26A and memory unit 26N at the same time).

The following summarizes a few example conditions where MIF 20 may inefficiently utilize system memory 24: the display resolution is 512 pixels wide, each pixel is stored as 32 bit data (e.g., 4 bytes), the display tile for rendering is 16×16 pixels, the page size is 4096 bytes, there are two memory channels (e.g., MC 22A and MC 22N), the interleave granularity is 1024 bytes, and the surface is stored in linear fashion in memory 26. As another example where MIF 20 may inefficiently utilize system memory 24, the conditions may be: the display resolution is 128 pixels wide, each pixel is stored as 32 bit data (e.g., 4 bytes), the display tile for rendering is 16×16 pixels, the page size is 4096 bytes, there are two memory channels (e.g., MC 22A and MC 22N), the interleave granularity is 1024 bytes, and the surface is stored in tiled fashion in memory 26, where each tile is 4×4 pixels.

As described above, MIF 20 is described as accessing system memory 24 via MC 22A and MC 22N. In other examples, IC 12 may include more than two memory controllers. Even in examples where IC 12 includes more than two memory controllers, there may be cases where the linear or tile storage scheme may result in inefficient utilization of system memory 24 when MIF 20 subsequently retrieves the pixel values for rendering. For example, if the display resolution is 512 pixels wide, each pixel is stored as 32-bit data, the display tile is 16×16, the page size is 4096 bytes, there are four memory channels, the interleave granularity is 1024 bytes, and the surface is stored in the linear fashion in system memory 24, then MIF 20 may inefficiently utilize system memory 24 when retrieving pixel values for rendering as part of the rasterization that is performed by GPU 14. As another example, if the display resolution is 128 pixels wide, each pixel is stored as 32-bit data, the display tile is 16×16, the page size is 4096 bytes, there are four memory channels, the interleave granularity is 1024 bytes, and the surface is stored in the tiled fashion in system memory 24, where each tile is 4×4 pixels, then MIF 20 may inefficiently utilize system memory 24 when retrieving pixel values for rendering as part of the rasterization that is performed by GPU 14.

The example techniques described in this disclosure may modify locations in system memory 24 where MIF 20 stores the pixel values, generated by GPU 14, such that when GPU 14 subsequently receives the pixel values for rendering, MIF 20 accesses system memory 24 in a more efficient manner. For example, the techniques described in this disclosure may pad bits into the pages of system memory 24. Padding bits may mean reserving certain number of bits within one or more pages that cannot be used to store pixel values. Again, for purposes of illustration, the techniques are described in context of padding bytes for simplicity. For example, rather than using all 4096 bytes of a page to store pixel values, GPU 14 may utilize a subset of the 4096 bytes of the page in which MIF 20 may store pixel values, and the remaining bytes may be referred to as padding bytes.

In this manner, GPU 14 may utilize more pages within system memory 24 where the pixel values of the surfaces are stored. However, with byte padding, GPU 14 may be able to receive pixel values from both memory unit 26A and memory unit 26N of system memory 24 at the same time (e.g., in parallel) to render a display tile. For example, with byte padding, MIF 20 may be able to retrieve pixel values for a display tile from both memory unit 26A and memory unit 26N at the same time, which allows GPU 14 to receive the pixel values from both memory unit 26A and memory unit 26N at the same time. Furthermore, system memory 24 may provide vast amounts of memory for storage. Therefore, the additional usage of the pages of system memory 24, in accordance with the example techniques described in this disclosure, may not negatively impact the functionality of device 10.

Referring back to FIG. 1, for byte padding, GPU driver 18 may transmit instructions that cause GPU 14 to store the pixel values for portions of the surface (e.g., the image or graphics content that is to be displayed on the display of device 10) such that the pixel values are stored using the interleave granularity, as described above. For example, for storing the surface in linear fashion, GPU 14 would transmit 1024 bytes of a row of surface 32A (FIG. 3A) and the virtual address for where this data is to be stored to MIF 20. MIF 20 may then store the 1024 bytes of the row of surface 32A (FIG. 3A) in page 0 of memory unit 26A of system memory 24 via MC 22A. GPU 14 may also transmit the next 1024 bytes of the row of surface 32A (FIG. 3A) and the virtual address for where this data is to be stored to MIF 20. MIF 20 may then store 1024 bytes of the row of surface 32A in page 0 of memory unit 26N of system memory 24 via memory unit 22N. Next, however, rather than moving to the next row of surface 32A, GPU driver 18 may reserve a certain number of bytes in page 0 for padding. These padding bytes may not be useable to store pixel values for any of the pixels within surface 32A. Graphics driver 18 may then instruct GPU 14 to store the pixel values in the remainder of page 0.

For example, graphics driver 18 may transmit virtual addresses to GPU 14 that indicate to GPU 14 where the data is to be stored. However, these virtual addresses may not map to the physical addresses of the reserved padding bytes. In this way, when MIF 20 stores the data received from GPU 14, MIF 20 may bypass the padding bytes, and store the pixel values in system memory 24 in locations other than where the padding bytes are located in system memory 24.

Figure 8:
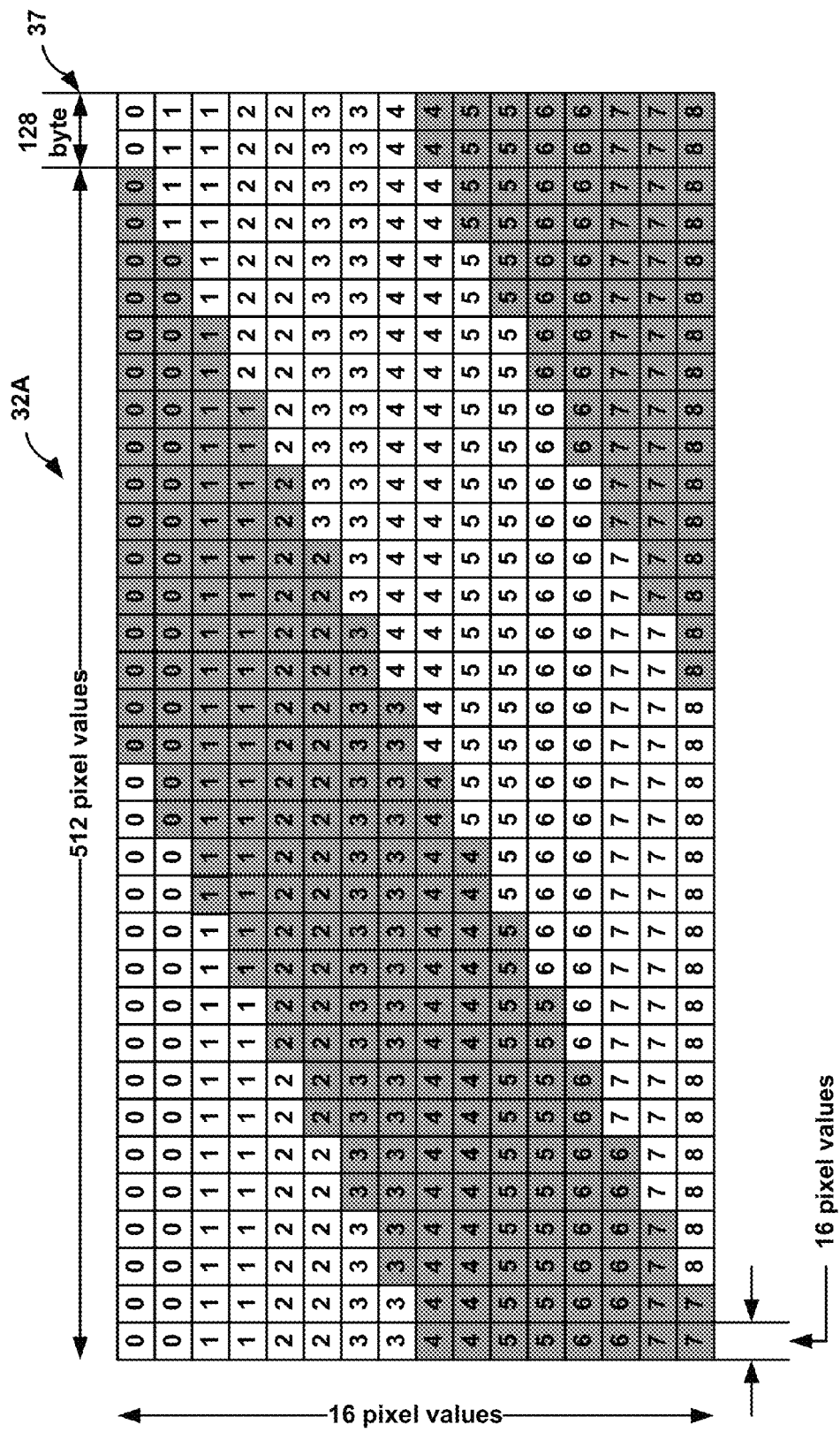
FIG. 8 is a graphical diagram illustrating storage of a surface in system memory in a linear fashion with byte padding.

FIG. 8 is a graphical diagram illustrating storage of a surface in system memory in a linear fashion with byte padding. In the example illustrated in FIG. 8, GPU 14 may store the pixel values of surface 32A (FIG. 4); however, GPU driver 18 may pad bytes in pages of system memory 24. FIG. 8 uses the same background color and page numbering scheme as used in FIGS. 4 and 6. For example, the numerical values in FIG. 8 indicate which page of system memory 24 is used to store the pixel values of surface 32A. Also, in FIG. 8, the white background indicates that MIF 20 stored the pixel values, generated by GPU 14, in a page in memory unit 26A via MC 22A, and the gray background indicates that MIF 20 stored the pixel values, generated by GPU 14, in the page in memory unit 26N via MC 22N.

GPU driver 18 may transmit instructions that cause GPU 14 to store the first 256 pixel values of surface 32A because 256 pixel values may include 1024 bytes (i.e., 256 pixel values*4 bytes per pixel value equals 1024 bytes), and 1024 bytes may be the interleave granularity. GPU driver 18 may also transmit the virtual addresses of where GPU 14 is to store the pixel values. GPU 14 may then transmit the pixel values and the virtual addresses to MIF 20. MIF 20 may then store the pixel values in page 0 of memory unit 26A of system memory 24 via MC 22A.

Because the interleave granularity is 1024 bytes, GPU driver 18 may transmit instructions that cause GPU 14 to store the next 256 pixel values of surface 32A, and transmit virtual addresses of where GPU 14 is to store the next 256 pixel values of surface 32A. MIF 20 may then store these 256 pixel values in page 0 of memory unit 26N of system memory 24 via MC 22N. Again, 256 pixel values include 1024 bytes, which is the interleave granularity. In this example, page 0 would now store pixel values for the first row of surface 32A, and would have used up a total of 2048 bytes by storing the pixel values for the first row of surface 32A.

In the example illustrated in FIG. 8, GPU driver 18 may reserve the next 128 bytes in page 0 as padding bytes. For example, GPU driver 18 may be configured with the number of padding bytes GPU driver 18 should reserve, which would be 128 bytes in this example. It should be understood that the 128 padding bytes are not part of surface 32A, but rather reserved bytes in page 0 that are not used to store the pixel values of surface 32A.

In general, it may be immaterial what the actual digital values of the padding bytes are because the padding bytes are not used to store any actual pixel values. For example, GPU driver 18 may cause MIF 20 to assign the 128 padding bytes all the value of a digital one or a digital zero. Alternatively, GPU driver 18 may allow the 128 padding bytes to float (e.g., allow the 128 padding bytes to float to either a digital one or a digital zero) by not assigning the 128 padding bytes any digital values.

In FIG. 8, the 128 padding bytes are illustrated in the last two columns, and labeled with reference number 37, to assist with understanding. For example, the width of a column is 16 pixel values, and there are 4 bytes per pixel value; therefore, the width of a column in bytes is 64 bytes (i.e., 16 pixel values*4 bytes per pixel value equals 64 bytes). Accordingly, the width of two columns is 128 bytes (i.e., 64 bytes*2 equals 128 bytes). However, to reiterate, the last two columns in FIG. 8 are not part of surface 32A. Rather, surface 32A includes all rows and columns, except the bytes in the last two columns, which are the padding bytes.

While the actual values of the padding bytes may be immaterial, GPU driver 18 may track which bytes within a page are reserved as padding bytes so that GPU driver 18 can instruct GPU 14 to not receive values from the padding bytes during rendering. For instance, in the example illustrated in FIG. 8, GPU driver 18 may reserve the 128 bytes after the first 2048 bytes (e.g., bytes 2049 to 2176) as padding bytes. In this example, during rendering, GPU driver 18 may cause GPU 14 to receive the first 2048 bytes in page 0, then cause GPU 14 to receive bytes after the next 128 bytes in page 0, which are the padding byte and hence do not represent any actual pixel values. In this manner, GPU driver 18 may transmit instructions that cause GPU 14 to instruct MIF 20 to store pixel values in bits other than the padding bits, of the pages. The reserved padding bits may be specifically reserved so that GPU 14 does not cause MIF 20 to store pixel values in these padding bits of the pages, and instead causes MIF 20 to store pixel values in bits other than the padding bits.

For example, as described above, GPU driver 18 may transmit virtual addresses to GPU 14 of where the pixel values are to be stored. In some examples, GPU driver 18 may transmit virtual addresses to GPU 14 that do not map to physical addresses of the padding bytes. In this manner, when GPU 14 transmits the virtual addresses to MIF 20 for storage, MIF 20 avoids storing the pixel values in the padding bytes. As another example, GPU driver 18 may indicate to MIF 20 which bytes of system memory 24 are reserved as padding bytes. In this example, when MIF 20 maps the virtual addresses received from GPU 14 to physical addresses, MIF 20 may avoid mapping the virtual addresses to physical addresses of where the padding bytes are located in system memory 24. There may be other ways in which GPU driver 18 may ensure that pixel values are not stored in the padding bytes, and aspects of this disclosure are not limited to any particular manner in which GPU driver 18 may ensure that pixel values are not stored in the padding bytes.

With GPU driver 18 reserving the 128 padding bytes, the 128 padding bytes results in 2176 bytes of page 0 being used up (i.e., 2048 plus 128 equals 2176), meaning that there are 1920 bytes remaining in page 0 (i.e., 4096 minus 2176 equals 1920). GPU driver 18 may then instruct GPU 14 to store the bytes from the second row of surface 32A, which results in MIF 20 storing the bytes from the second row of surface 32A into the remaining bytes of page 0 (e.g., bytes other than the padding bytes). For example, page 0 would have sufficient storage space to store pixel values for 480 pixels (i.e., 480 pixels*4 bytes per pixel equals 1920 bytes). Therefore, the last 32 pixel values in the second row of surface 32A are stored in page 1, rather than in page 0, as was the case in the example illustrated in FIG. 4.

In aspects described in this disclosure, the 128 padding bytes count towards the 1024 byte interleave granularity. For example, GPU driver 18 would instruct GPU 14 to store 1024 bytes such that MIF 20 stores the 1024 bytes in page 0 of memory unit 26A via MC 22A. GPU driver 18 would also instruct GPU 14 to store the next 1024 bytes such that MIF 20 stores the 1024 bytes in page 0 of memory unit 26N via MC 22N due to the 1024 byte interleave granularity. After this, the 128 padding bytes would be counted as part of the next 1024 bytes that MIF 20 would have stored in page 0 of memory unit 26A via MC 22A. For example, although MIF 20 may not explicitly store any values in the 128 padding bytes, it is assumed that had GPU 14 requested to store values in the reserved 128 padding bytes, MIF 20 would have stored values in the 128 padding bytes of page 0 in memory unit 26A via MC 22A. Therefore, in FIG. 8, the 128 padding bytes at the end of the first row are illustrated with white background.

Also, because the 128 padding bytes count toward the 1024 interleave granularity, GPU 14 would then store 896 bytes of pixel values of surface 32A such that MIF 20 stores 896 bytes of pixel values of surface 32A in page 0 of memory unit 26A via MC 22A (i.e., 896 bytes plus 128 bytes equals 1024 bytes). Upon receiving instructions from GPU 14, MIF 20 would store the next 1024 bytes of pixel values of surface 32A in page 0 of memory unit 22N via MC 22N, and page 0 would be full. GPU driver 18 would then instruct GPU 14 to repeat the above steps such that MIF 20 stores bytes in page 1 of memory units 26A and 26N of system memory 24 via MC 22A and MC 22N, respectively. GPU driver 18 may also pad bytes in page 1 in the manner illustrated in FIG. 6.

For example, after page 0 is full, there are still 32 pixel values in the second row of surface 32A that need to be stored (i.e., the last two columns of surface 32A without counting the last two columns referenced as the 128 padding bytes). GPU 14 may store the 32 pixel values, which includes 128 bytes (i.e., 32 pixel values*4 bytes per pixel value equals 128 bytes) such that MIF 20 stores the 32 pixel values in page 1 of memory unit 26A via MC 22A. In this example, GPU driver 18 reserved the next 128 bytes of page 1 as padding bytes. Therefore, 256 bytes of page 1 are used up, and because the 128 padding bytes count towards the interleave granularity, it is assumed that MIF 20 stored 256 bytes in memory unit 26A via MC 22A.

In this example, GPU 14 may be able to store 768 more bytes such that MIF 20 stores the 768 more bytes in page 1 of memory unit 26A via MC 22A because 768 bytes plus 256 bytes equals 1024 bytes, which is the interleave granularity. In the example illustrated in FIG. 8, 768 bytes represents 192 pixel values (i.e., 768 bytes divided 4 bytes per pixel value equals 192). Also, in the example illustrated in FIG. 8, the width of a column is 16 pixel values. Therefore, 12 columns equal 192 pixel values (i.e., 192 pixel values divided 16 pixel values equals 12). Accordingly, as illustrated in FIG. 8, the first 12 columns of the third row are with white background to indicate that these pixel values are stored in page 1 of memory unit 26A via MC 22A.

Once GPU 14 instructs MIF 20 to store the 192 pixel values, MIF 20 reaches the interleave granularity of 1024 bytes. GPU driver 18 then causes GPU 14 to store the next 1024 bytes such that MIF 20 stores the next 1024 bytes in page 1 of memory unit 26N via MC 22N. This is illustrated in FIG. 8 with the gray background in the next 16 columns in the third row. In FIG. 8, the 16 columns together include 1024 bytes (i.e., 16 columns*16 pixel values per column*4 bytes per pixel value equals 1024 bytes). Then, MIF 20 reaches the interleave granularity, and GPU driver 18 causes GPU 14 to store pixel values such that MIF 20 stores the pixel values in page 1 of memory unit 26A via MC 22A (e.g., switch from storing in memory unit 26N of system memory 24 via MC 22N to storing in memory unit 26A of system memory 24 via MC 22A). These steps would repeat until GPU 14 stored all of the pixel values of surface 32A such that MIF 20 stored all of the pixel values of surface 32A in pages of system memory 24 by interleaving the storage in memory unit 26A and memory unit 26N every 1024 bytes.

At the conclusion of storing pixel values, GPU driver 18 completed instructing GPU 14 to store the pixel values for the entirety of surface 32A. Again, the size of surface 32A may be the same as the size of the display of device 10. Therefore, at the conclusion of storing pixel values, GPU 14 may have stored the pixel values for all of the pixels on the display of device 10, and may be ready to retrieve pixel values for rendering the pixels on the display, as part of the rasterization.

It should be noted that due to the byte padding, the number of pages needed to store the pixel values of surface 32A, as illustrated in the example of FIG. 8, is 9 (i.e., pages 0-8). Without byte padding (e.g., the example of FIG. 4), the number of pages needed to store the pixel values for surface 32A, as illustrated in FIG. 4, is 8 (e.g., pages 0-7). Therefore, byte padding may utilize additional storage space in system memory 24.

However, with byte padding, when GPU 14 receives pixel values from system memory 24 for rendering a display tile, MIF 20 may be able to access pixel values for that display tile from both memory unit 26A via MC 22A and memory unit 26N via MC 22N at the same time. For example, similar to FIG. 4, each column in FIG. 8 corresponds to a display tile (e.g., a display tile of 16×16 pixels). Due to the byte padding, the pixel values for the pixels within the display tile are retrieved equally from memory unit 26A and memory unit 26N. In other words, there is channel load balance between retrieving pixel values from memory unit 26A and memory unit 26N. For example, GPU 14 may receive 50% of the pixel values for the display tile by MIF 20 retrieving the pixel values from memory unit 26A, and 50% of the pixel values for the display tile by MIF 20 retrieving the pixel values from memory unit 26N.

For instance, in the example illustrated in FIG. 8, each column includes equal portions with white background and gray background. For example, assume that the 16×16 pixel values in the first column in FIG. 8 are the pixel values for the first display tile. In this example, GPU 14 may cause MIF 20 to retrieve the pixel values for the first display tile from pages 0-3 in memory unit 26A via MC 22A (e.g., the portions of the first column with white background), and at the same time, cause MIF 20 to retrieve the pixel values for the first display tile from pages 4-7 in memory unit 26N via MC 22N (e.g., the portions of the first column with gray background).

In this manner, each of the channels to system memory 24 provided by MC 22A and MC 22N are utilized, and potentially utilized at the same time, when retrieving pixel values for a display tile. However, in the example illustrated in FIG. 4, MIF 20 may have been limited to retrieving the pixel values for the first display tile only from memory unit 26A via MC 22A, while access to memory unit 26N via MC 22N remained idle. In other words, in the example of FIG. 4, there is poor channel load balance between the channels provided by MC 22A and MC 22N. In the example of FIG. 8, there is improved channel load balance between the channels provided by MC 22A and MC22N.

For the reasons described above, GPU 14 may be able to cause MIF 20 to retrieve pixel values for a display tile using both memory unit 26A and memory unit 26N at the same time, rather than from only one of memory unit 26A or memory unit 26N, as would be the case in the example illustrated in FIG. 4. This may allow GPU 14 to receive pixel values for a display tile at twice the rate, as compared to the example where there is no byte padding (e.g., the example illustrated in FIG. 4). The ability for GPU 14 to receive pixel values for a display tile at twice the rate may allow GPU 14 to render the pixels on that display tile of the display of device 10 at twice the rate, as compared to examples where there is no byte padding.

For example, a video game may require GPU 14 to render the pixels on the display at a refresh rate of 30 surfaces per second. By rendering the pixels on the display of device 10 at twice the rate, GPU 14 may be able to render the pixels on the display at a refresh rate of 60 surfaces per second, which may provide the user with a richer gaming experience. In this way, the techniques described in this disclosure may be considered as sacrificing a limited amount of storage space in system memory 24 with the possibility of increasing the rendering rate fairly drastically.

Although the example of FIG. 8 illustrates 128 padding bytes, aspects of this disclosure are not so limited. In some examples, the number of padding bytes may be any factor of $2^n$, where n is any integer value. For example, GPU driver 18 may be configured to reserve 2, 4, 8, 16, 64, 128, 256, 512, 1024, and so forth number of padding bytes. For padding bytes greater than or equal to 128 bytes, the distribution of load between retrieving pixel values from memory unit 26A and memory unit 26N may be 50% for each of the display tiles. In some examples, the number of padding bytes may be any integer value, and not necessarily limited to any factor of $2^n$.

For padding bytes less than 128 bytes, the distribution of load may be less than 50% overall for all of the display tiles. Even in cases where the distribution of load is less than 50%, the distribution of load may still be better than the distribution in the example of FIG. 4 (e.g., where the load of retrieving pixel values falls all on either memory unit 26A or memory unit 26N for a given display tile). For example, for padding bytes less than 128 bytes, from some display tiles, GPU 14 may receive from MIF 20 fewer than 50% of the pixel values from memory unit 26A and greater than 50% of the pixel values from memory unit 26N, or vice-versa. However, in the example of FIG. 4, for every single display tile, MIF 20 may retrieve pixel values only from one of memory unit 26A or memory unit 26N. Because 128 padding bytes may be the minimum number of padding bytes that may be needed to achieve 50% distribution of load between memory unit 26A and memory unit 26N, GPU driver 18 may be configured to reserve 128 padding bytes in each of the pages, when the surface is stored in a linear fashion such as surface 32A.

Figure 9:
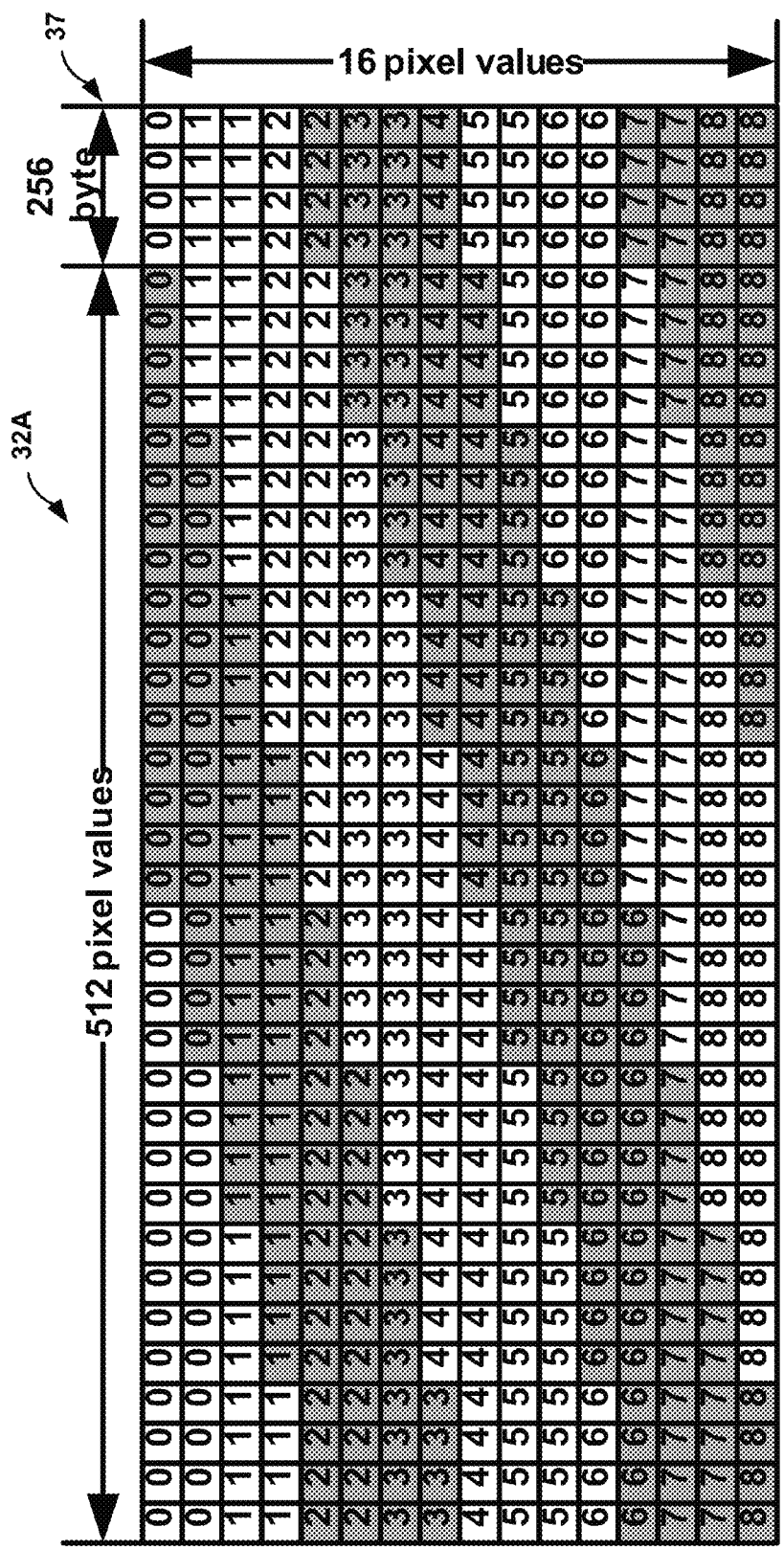
FIGS. 9-11 are additional graphical diagrams illustrating storage of a surface in system memory in a linear fashion with byte padding.
Figure 10:
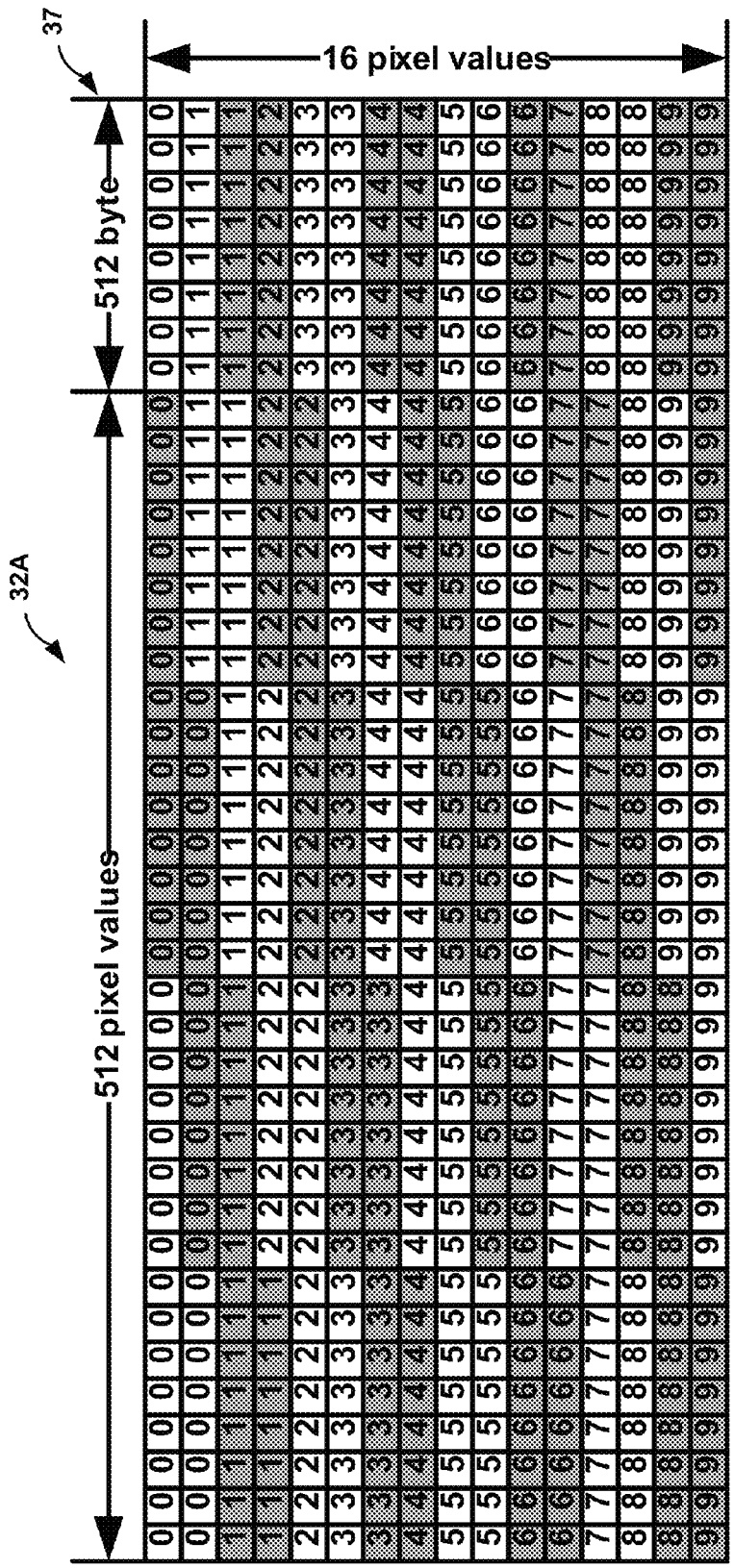
Figure 11:
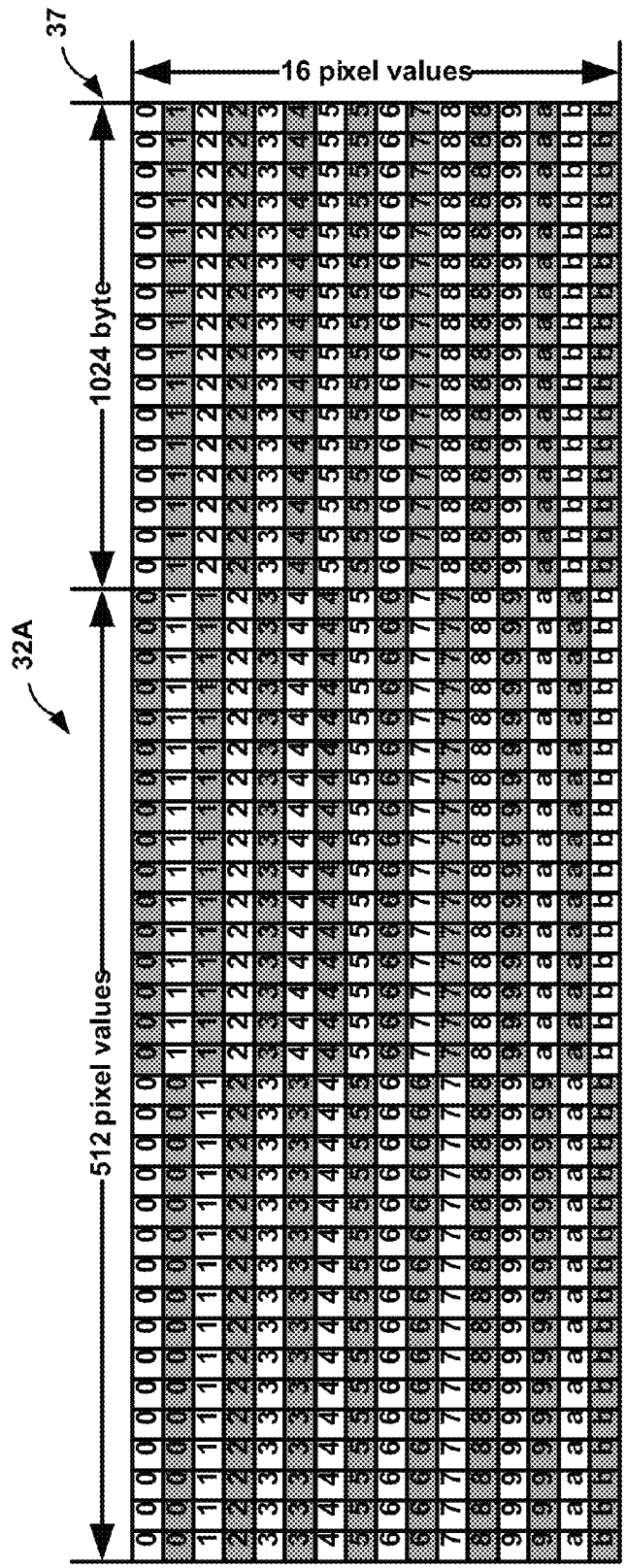

FIGS. 9-11 are additional graphical diagrams illustrating storage of a surface in system memory in a linear fashion with byte padding. FIG. 9 illustrates an example where the number of padding bytes is 256 as indicated by reference number 37, FIG. 10 illustrates an example where the number of padding bytes is 512 as indicated by reference number 37, and FIG. 11 illustrates an example where the number of padding bytes is 1024 as indicated by reference number 37.

Similar to FIGS. 4 and 8, in FIGS. 9-11 the white background indicates storage in memory unit 26A via MC 22A, and gray background indicates storage in memory unit 26N via MC 22N. As illustrated in FIGS. 9-11, the pixel values for each display tile (i.e., one column in FIGS. 9-11) are stored equally in memory unit 26A and memory unit 26N. Similar to FIG. 8, in FIGS. 9-11, GPU 14 may be able to retrieve pixel values for a display tile in parallel from both memory unit 26A via MC 22A and memory unit 26N via MC 22N.

Furthermore, although the examples with respect to FIG. 8 are described in the context where the surface is stored in system memory 24 in a linear fashion, aspects of this disclosure are not so limited. The techniques of this disclosure may function in a similar manner in examples where the surface is stored in a tiled fashion in the system memory 24.

Figure 12:
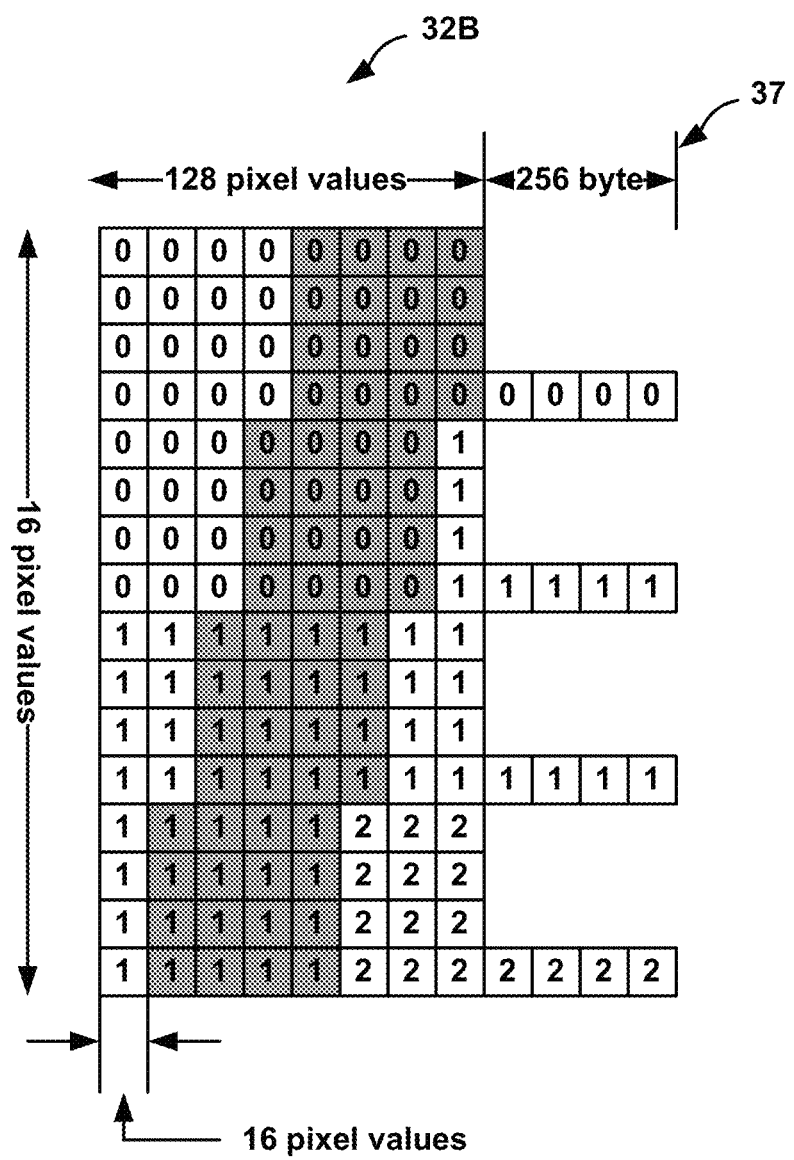
FIG. 12 is a graphical diagram illustrating storage of a surface in system memory in a tiled fashion with byte padding.

FIG. 12 is a graphical diagram illustrating storage of a surface in system memory in a tiled fashion with byte padding. In the example illustrated in FIG. 12, GPU 14 may store the pixel values of surface 32B (FIG. 6); however, GPU driver 18 may pad bytes in pages of system memory 24. FIG. 12 uses the same background color and page numbering scheme as used in FIGS. 4, 6, and 8-11.

In the example illustrated in FIG. 12, GPU driver 18 may reserve 256 bytes in page 0 as padding bytes, as illustrated in the fourth row. Again, it should be understood that the 256 padding bytes are not part of surface 32B, but rather reserved bytes in the pages that are not used to store the pixel values of surface 32B. In FIG. 12, the 256 padding bytes are illustrated in the last four columns with reference number 37 to assist with understanding. For example, the width of a column is 16 pixel values, and there are 4 bytes per pixel value; therefore, the width of a column in bytes is 64 bytes (i.e., 16 pixel values*4 bytes per pixel value equals 64 bytes). Accordingly, the width of four columns is 256 bytes (i.e., 64 bytes*4 equals 256 bytes).

As illustrated, GPU driver 18 may instruct GPU 14 to store 2048 bytes of the surface 32B. MIF 20 may store the 2048 bytes using the interleaving storage technique with interleave granularity of 1024 bytes, in page 0 of system memory 24 via memory unit 26A and 26N through MC 22A and 22N, respectively. In FIG. 12, GPU driver 18 may reserve the next 256 bytes of page 0 as padding bytes (e.g., GPU driver 18 may be configured to set the number of padding bytes to 256 padding bytes). For example, the last four columns in the fourth row represent the 256 bytes that GPU driver 18 reserves in page 0. Also, the white background indicates that these padding bytes are counted as if MIF 20 stored to these bytes in memory unit 26A via MC 22A, although MIF 20 may not actually store to these padding bytes.

In FIG. 12, not all of the rows are illustrated with padding bytes. This is because of the pixel value storage in tiled fashion. For example, assume that each surface tile of surface 32B is 4×4 pixel values. Therefore, each surface tile encompasses four rows and four columns in the display of device 10. For example, similar to FIG. 6, in FIG. 12, four rows and one column represent four tiles. Accordingly, rows 1-4 and column 1-4 in FIG. 12 represents 16 surface tiles for a total of 1024 bytes. For instance, four tiles per four rows and one column multiplied by four columns equals 16 surface tiles. There are 64 bytes per surface tile (e.g., 16 pixels per tile*4 byte per pixel equals 64), and 16 surface tiles multiplied by 64 bytes per surface tile equals 1024 bytes.

In this case, after GPU 14 stores the pixel values for the rows 1-4 and column 1-4 in FIG. 12, MIF 20 may have used up 1024 bytes of page 0. GPU 14 may then store the next 1024 bytes (e.g., rows 5-8 and column 1-4) such that MIF 20 stores the next 1024 bytes in page 0 via memory unit 26N, to use up 2048 bytes of page 0. In this example, GPU driver 18 may reserve the next 256 bytes of page 0, which is the reason why the end of the fourth row in FIG. 12 includes the 256 padding bytes.

GPU driver 18 may instruct GPU 14 to then store the remaining pixel values in pages of system memory 24 as illustrated in FIG. 12. In this example, GPU 14 may utilize three pages (e.g., page 0-2) of system memory 24 to store the pixel values of surface 32, whereas, in the example of FIG. 6, GPU 14 may have utilized two pages (e.g., pages 0 and 1) of system memory 24 to store the pixel values of surface 32.

However, in the example illustrated in FIG. 12, when GPU 14 receives pixel values for rendering the 16×16 display tiles during rasterization, MIF 20 may be able to retrieve pixel values for at least some of the display tiles using both memory unit 26A and memory unit 26N at the same time. For example, the first full column in FIG. 12 represents one display tile. As illustrated, the entire first full column in FIG. 12 is with white background. Therefore, when retrieving pixel values for the first display tile, MIF 20 may only utilize memory unit 26A, and not memory unit 26N because, as described above, the white background indicates that access is only through memory unit 26A.

Although, retrieving pixel values for the first display tile may not provide load balancing between memory unit 26A and memory unit 26N, retrieving pixel values for subsequent display tiles may result in better load balancing. For example, 75% of the second full column is with white background and 25% of the second full column is with gray background. Accordingly, for this second display tile, GPU 14 may receive 75% of the pixel values from memory unit 26A and 25% of the pixel values from memory unit 26N. For the third full column (e.g., the third display tile), 50% of the third full column is with white background and 50% of the third full column is with gray background. Accordingly, for this third display tile, GPU 14 may receive 50% of the pixel values from memory unit 26A and 50% of the pixel values from memory unit 26N. In this case, MIF 20 may achieve full distribution of load when retrieving pixel values for the third display tile for rendering.

In this way, the example illustrated in FIG. 12, illustrates that with 256 byte padding, MIF 20 may not achieve full distribution of load to 50% for every display tile. However, with 256 byte padding, GPU 14 may still achieve better distribution of load when MIF 20 retrieves the pixel values for a display tile as compared to the example illustrated in FIG. 6 where every display tile required MIF 20 to retrieve pixel values only from memory unit 26A or memory unit 26N, but not from both.

Furthermore, it may not be necessary for GPU driver 18 to be configured to reserve 256 padding bytes in every example where the surface is stored in tiled fashion. For example, GPU driver 18 may be configured to reserve any factor of $2^n$ (e.g., 2, 4, 8, 16, 64, 128, 256, 512, 1024, 2048, etc.) number of padding bytes. In some examples, if GPU driver 18 reserved 512 or greater number of padding bytes, GPU 14 may receive 50% of the pixel values from memory unit 26A and 50% of the pixel values from memory unit 26N for every display tile during the rendering. Because 512 padding bytes may be the least number of padding bytes needed to achieve 50% distribution of load between memory unit 26A and memory unit 26N, GPU driver 18 may be configured to pad 512 bytes in examples where the surface is stored in tiled fashion and the size of the surface tile is 4×4 pixel values.

Figure 13:
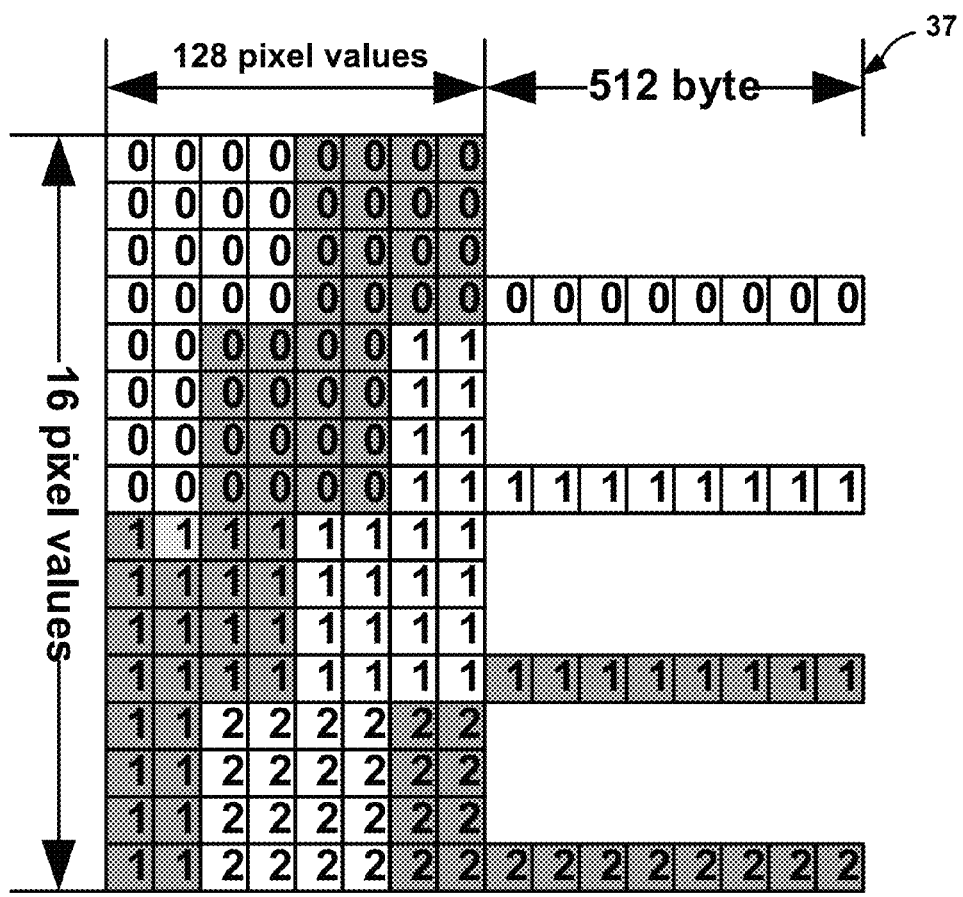
FIGS. 13 and 14 are additional graphical diagrams illustrating storage of a surface in system memory in a tiled fashion with byte padding.
Figure 14:
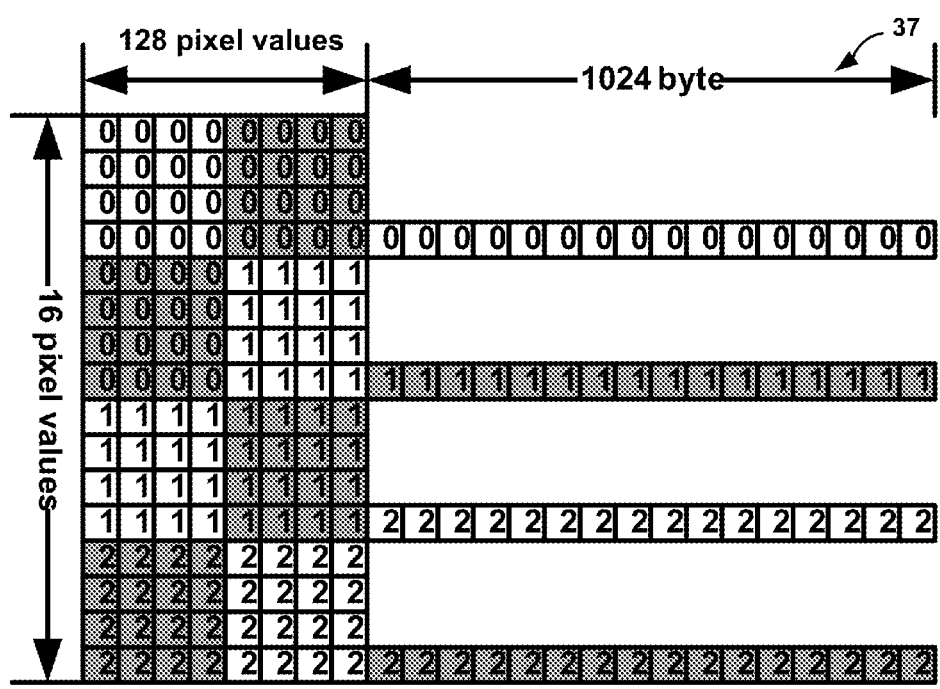

FIGS. 13 and 14 are additional graphical diagrams illustrating storage of a surface in system memory in a tiled fashion with byte padding. FIG. 13 illustrates an example where the number of padding bytes is 512 as indicated by reference number 37, and FIG. 14 illustrates an example where the number of padding bytes is 1024 as indicated by reference number 37.

Similar to the above examples, in FIGS. 13 and 14 the white background indicates storage in memory unit 26A via MC 22A, and gray background indicates storage in memory unit 26N via MC 22N. As illustrated in FIGS. 13 and 14, the pixel values for each display tile (i.e., one column in FIGS. 13 and 14) are stored equally in memory unit 26A and memory unit 26N. In the example of FIGS. 13 and 14, GPU 14 may be able to receive pixel values for a display tile in parallel from both memory unit 26A via MC 22A and memory unit 26N via MC 22N because MIF 20 may be able to retrieve pixel values for the display tile in parallel from both memory unit 26A via MC 22A and memory unit 26N via MC 22N. Also, while in the example of FIG. 12, GPU 14 may not be able to receive equal number of pixel values from each one of memory unit 26A and memory unit 26N for all of the display tiles, in the example of FIGS. 13 and 14, GPU 14 may be able to receive equal number of pixel values from each one of memory unit 26A and memory unit 26N.

Moreover, although the preceding examples are described in cases where there are two memory units (e.g., memory unit 26A and memory unit 26N), aspects of this disclosure are not so limited. The techniques of this disclosure may be extendable to examples where system memory 24 includes more than two memory units. For example, the number of memory units in system memory 24 may be any integer value greater than or equal to 2. In these examples, integrated circuit (IC) 12 of FIG. 1 may include a corresponding memory controller (MC) for each of the memory units in system memory 24.

Figure 15:
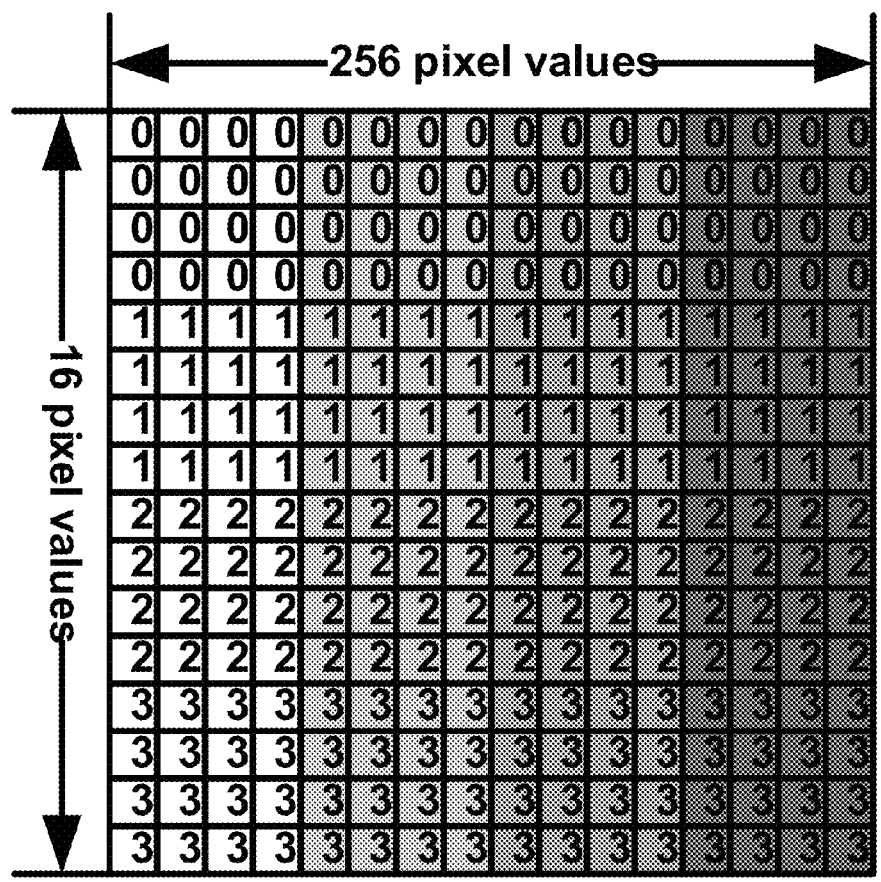
FIG. 15 is another graphical diagram illustrating storage of a surface in system memory in a tiled fashion.

FIG. 15 is another graphical diagram illustrating storage of a surface in system memory in a tiled fashion. In the example of FIG. 15, system memory 24 may include four memory units 26, and IC 12 may include a corresponding one of MCs 22 for each of the four memory units 26. In the example of FIG. 15, a surface that is to be displayed includes 256 pixel values by 16 pixel values, and this surface is stored in a tiled fashion with interleave granularity of 1024 bytes. As illustrated in FIG. 15, there may be no load distribution between the four memory units 26 when GPU 14 receives the pixel values for rendering a display tile. For example, in FIG. 15, the white background and the shades of gray background indicate which one of the four memory units 26 is used to store and retrieve the pixel values for a display tile. In this example, MIF 20 may be able to retrieve each display tile from only one of the four memory units 26, and therefore, GPU 14 may be able to receive pixel values for each display tile from only one of the four memory units 26.

Figure 16:
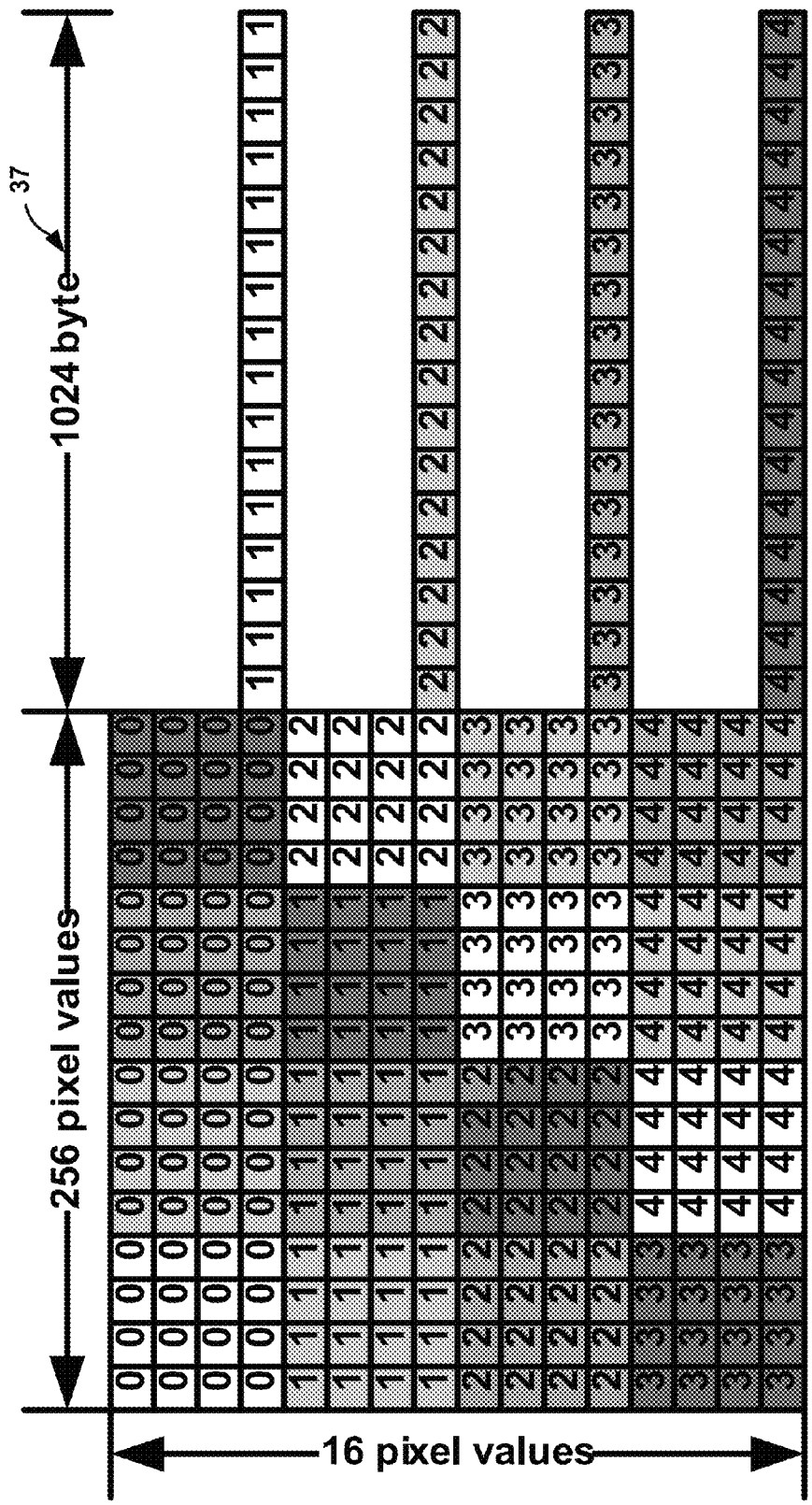
FIG. 16 is another graphical diagram illustrating storage of a surface in system memory in a tiled fashion with byte padding.

FIG. 16 is another graphical diagram illustrating storage of a surface in system memory in a tiled fashion with byte padding. For instance, FIG. 16 illustrates the result of byte padding when applied to the example illustrated in FIG. 15. For instance, if GPU driver 18 reserved 1024 padding bytes after GPU 14 stored 4096 bytes via MIF 20, as illustrated in FIG. 16, GPU 14 may receive equal number of pixel values from each of the four memory units 26 for the display tile, as also illustrated in FIG. 16, because MIF 20 may retrieve equal number of pixel values from each of the four memory unit 26. For example, MIF 20 may retrieve 25% of the pixel values for the display tile from the first of the four memory units 26, retrieve 25% of the pixel values for the display tile from the second of the four memory units 26, retrieve 25% of the pixel values for the display tile from the third of the four memory units 26, and retrieve 25% of the pixel values for the display tile from the fourth of the four memory units 26. This is illustrated in FIG. 16 with white background and the shades of gray background.

For example, each display tile includes 25% white background, 25% of a first shade of gray background, 25% of a second shade of gray background, and 25% of a third shade of gray background. The shades of gray may be more clearly visible from the 1024 padding bytes. For example, in the 1024 padding bytes, the boxes with the value 1 are white, the boxes with value 2 are a first shade of gray, the boxes with value 3 are a second, darker shader of gray, and the boxes with value 4 are a third, even darker shader of gray.

In the examples described above, processor 16 executes GPU driver 18 that causes GPU 14 to store pixel values in system memory 24 via MIF 20. However, aspects of this disclosure are not so limited. For example, some GPUs may be designed to perform some amount of general processing, and are referred to as general purpose GPUs (GPGPUs). In such examples, the GPGPUs may execute a driver that causes the GPGPU to store pixel values in system memory 24 via MIF 20. For instance, in some examples, GPU 14 may be a GPGPU. In such examples, rather than processor 16 executing GPU driver 18, GPU 14 may be able to execute GPU driver 18, or include hardware, software, or firmware that perform the functions of GPU driver 18 described above.

For example, in some aspects described in this disclosure, a first processing unit such as processor 16 may reserve the padding bytes or bits in system memory 24. In these examples, a second, different processing unit such as GPU 14 may transmit a plurality of instructions to MIF 20 that causes MIF 20 to store the pixel values in the interleaving manner described above. In some alternate aspects, a processing unit, which may be GPU 14, may reserve the padding bytes by executing GPU driver 18, and in these examples, MIF 20 may receive instructions that cause MIF 20 to store the pixel values in the interleaving manner described above from the same processing unit (e.g., GPU 14 in this example). For purposes of illustration and ease of description, the techniques are described from the perspective where processor 16 executes GPU driver 18. However, techniques described in this disclosure should not be considered so limiting.

In general, the examples described above may describe techniques in which MIF 20 receives a plurality of instructions that instruct MIF 20 to store pixel values of a surface in system memory 24. In response to the instructions, MIF 20 may store the pixel values of the surface, in bits of system memory 24 other than reserved padding bits in system memory 24, in an interleaving manner between at least memory unit 26A of system memory 24 via MC 22A, and memory unit 26N of system memory 24 via MC 22N such that a first set of pixel values of a display tile are stored within memory unit 26A via MC 22A, and a second set of pixel values of the same display tile are stored within memory unit 26N via MC 22N. In some examples, MIF 20 may store the pixel values in the interleaving manner such that the first set of pixel values of the display tile must be stored within memory unit 26A via MC 22A, and the second set of pixel values of the same display tile must be stored within memory unit 26N via MC 22N.

As described above, in addition to receiving the instructions to store the pixel values, MIF 20 may also receive virtual addresses of where the pixel values of the surface are to be stored. MMU 21 of MIF 20 may map the virtual addresses to physical address of the bits of system memory 24 other than the reserved padding bits in system memory 24. In this example, MIF 20 may store the pixel values based on the physical addresses as mapped by MMU 21.

Because MMU 21 may not map the virtual addresses to physical addresses that correspond to the reserved padding bits, MIF 20 may store the pixel values in bits other than the padding bits of system memory 24. As one example, processor 16 may indicate to MMU 21 the physical addresses of the padding bits, and MMU 21 may utilize this information to avoid mapping virtual addresses to physical addresses of the padding bits. As another example, the virtual addresses that processor 16 transmits to GPU 14 may be selected such that the virtual addresses do not map to the physical addresses of the padding bits. In this example, GPU 14 may transmit the virtual addresses to MIF 20, and MMU 21 may then map the virtual addresses to physical address for bits other than the padding bits.

As described above, MIF 20 may store pixel values such that a first set of pixel values for a display tile is or must be stored in memory unit 26A, and a second set of pixel values for the same display tile is or must be stored in memory unit 26N. This result is illustrated in FIGS. 8 and 12.

For example, referring to FIG. 8, the first column may represent one display tile. In the first column, the first eight rows are illustrated with a white background meaning their pixel values are stored in memory unit 26A and the last eight rows are illustrated with a grey background meaning their pixel values are stored in memory unit 26N. The first eight rows of the first column may be considered as a first set of pixel values of surface 32A that correspond to a first set of pixels of the display tile (e.g., pixels in the first 8 rows of the 16×16 display tile), and the last eight rows of the first column may be considered as a second set of pixel values of surface 32A that correspond to a second set of pixels of the display tile (e.g., pixels in the second 8 rows of the 16×16 display tile). Therefore, in FIG. 8, the instructions from GPU driver 18 that instruct GPU 14 to cause MIF 20 to store pixel values in an interleaving manner result in MIF 20 storing a first set of pixel values of surface 32A that correspond to a first set of pixels of a display tile within memory unit 26A, and a second set of pixel values of surface 32A that correspond to a second set of pixels of a display tile within memory unit 26N.

FIG. 12 illustrates a similar result. For example, similar to FIG. 8, the second column may represent one display tile. In the second column, pixel values in the first 12 rows of surface 32B with white background may correspond to a first set of pixels of the display tile (e.g., the first 12 rows of the 16×16 display tile). In the second column, pixel values in the last 4 rows of surface 32B with grey background may correspond to a second set of pixels of the display tile (e.g., the last 4 rows of the 16×16 display tile). Because pixel values of the first 12 rows of the second column (e.g., the first set of pixel values) may be stored in memory unit 26A via MC 22A, and the pixel values of the last 4 rows of the second column (e.g., the second set of pixel values) may be stored in memory unit 26N via MC 22N, the instruction from GPU driver 18 that instruct GPU 14 to cause MIF 20 to store pixel values in an interleaving manner result in MIF 20 storing a first set of the pixel values of surface 32B that correspond to a first set of pixels of the display tile within memory unit 26A, and a second set of the pixel values of surface 32B that correspond to a second set of pixel of the display tile within memory unit 26N.

It should be understood that although the examples illustrated in FIGS. 4-16 describe the techniques where system memory 24 includes pages, aspects of this disclosure are not so limited. For example, even in examples where system memory 24 did not include pages, without byte padding, half of surface 32A and 32B may still be stored within memory unit 26A via MC 22A, and the other half of surface 32A and 32B may still be stored within memory unit 26N via MC 22N. In these cases, byte padding may shift the manner in which the pixel values are stored in system memory 24 such that when retrieving the pixel values, GPU 14 may be able to receive the pixel values for a display tile in parallel.

Also, although the above examples describe efficient access for retrieval of the pixel values, in some instances, the techniques described in this disclosure may promote efficient access for storage of pixel values as well. For example, without byte padding, GPU 14 may cause MIF 20 to store pixel values for an entire surface (e.g., surface 32A and 32B) using channels created by both MC 22A to memory unit 26A and MC 22N to memory unit 26N. However, even in these situations, for a given display tile, GPU 14 may utilize only one of MC 22A or MC 22N.

For instance, for the first display tile in surface 32A of FIG. 4, MIF 20 may utilize only MC 22A to store the pixel values in memory unit 26A. In other words, although for the entirety of surface 32A, MIF 20 may utilize MC 22A and MC 22N equally, for a given display tile MIF 20 may not utilize MC 22A and MC 22N equally. This may not allow MIF 20 to store pixel values of a display tile in parallel. With the byte padding, MIF 20 may be able to store pixel values of a display tile in parallel. For example, with respect to FIGS. 8-11, 13, 14, and 16, MIF 20 may store half of the first display tile using MC 22A, and in parallel (e.g., a substantially a same time) store the other half of the first display tile using MC 22N.

As described with respect to FIGS. 4-16, byte padding may improve channel load balance when retrieving pixel values for rendering display tiles. Channel load balance may be measured with display tile channel utilization (u) which is defined as follows: $u=T/(n*b)$; where u is the channel utilization, T is the total number of pixels of a display tile, n is the number of channels to system memory 24, and b is the maximum number of pixels of any channel.

For example, assume there are four channels to system memory 24 (e.g., there are four MCs 22 in IC 12 and four memory units 26 in system memory 24). Also assume that a display tile includes 8 pixels, and MIF 20 retrieves all 8 pixels of the display tile from one of the memory units, and zero pixels from the other three memory units. In this example, T equals 8, n equals 4, and b equals 8. Accordingly, the channel utilization (u) equals 0.25 (e.g., 8/(4*8)). If MIF 20 retrieved equal number of pixel values from each of the four memory units 26 (e.g., retrieved two pixel values from each of the four memory units), then the channel utilization would equal 1 because T would equal 8, n would equal 4, and would equal 2, in this case. In general, channel utilization values that are close to or equal one indicate proper load balance between the memory units 26 within system memory 24.

As discussed above, in the examples illustrated in FIGS. 4-14, the display tile is 16×16 pixels, which means that T equals 256, and the number of memory channels is two, which means that n equals 2. In the example illustrated in FIGS. 4 and 6, the maximum number of pixels retrieved from the memory channels is 256 pixels for each of the display tiles. Accordingly, in FIGS. 4 and 6, b equals 256 pixel values for each of the display tiles, and the channel utilization (u) in the examples illustrated in FIGS. 4 and 6 is 0.5 (e.g., 256/(2*256) equals 0.5) for each of the display tiles. Also, FIG. 4 illustrates 32 display tiles (e.g., 32 full columns) each with a channel utilization of 0.5, and FIG. 6 illustrates 8 display tiles each with a channel utilization of 0.5. Therefore, the average channel utilization of the display tiles illustrated in FIGS. 4 and 6 is 0.5.

However, in the example illustrated in FIG. 8, the maximum number of pixel values retrieved for each one of the 32 display tiles is 128 pixel values. Therefore, the value of b for each of the display tiles is 128 pixel values. In FIG. 8, the channel utilization for each of the 32 display tiles is 256/(2*128), which equals 1 meaning proper channel load balancing between memory unit 26A and memory unit 26N.

In the example illustrated in FIG. 12, the maximum number of pixel values retrieved for each of the 8 display tiles is not the same. For instance, for the first display tile, which is the first full column in FIG. 12, GPU 14 retrieves all of the pixel values from memory unit 24A and none from memory unit 24N, which means that the maximum number of pixel values of any channel (i.e., b) is 256 pixel values for the first display tile because the column is 16 pixel values and the width of the column is 16 pixel values. For the second display tile, which is the second full column in FIG. 12, MIF 20 retrieves 192 pixel values from memory unit 26A (i.e., 0.75*256 equals 192), and 64 pixel values from memory unit 26N (i.e., 0.25*256 equals 64). In this case, the maximum number of pixel values of any channel for the second display tile is 192 pixel values from memory unit 26N since 192 is greater than 64.

Utilizing the same calculation, the value of b for each of the 8 display tiles in FIG. 12 may be calculated to be: 256 for the first, 192 for the second, 128 for the third, 192 for the fourth, 256 for the fifth, 192 for the sixth, 128 for the seventh, and 192 for the eighth display tile. With the values of b for each of the display tiles, and the value of T equaling 256 and n equaling 2, the channel utilization (u) for each of the display tiles may be calculated to be: ½ for the first, ⅔ for the second, 1 for the third, ⅔ for the fourth, ½ for the fifth, ⅔ for the sixth, 1 for the seventh, and ⅔ for the eighth display tile. In this example, the average of the channel utilization for each of the 8 display tiles is approximately 0.71 (i.e., (½+⅔+1+⅔+½+⅔+1+⅔)/8 equals approximately 0.71). Therefore, while the channel utilization for the example illustrated in FIG. 12 is not equal to 1, it is still greater than the 0.5 channel utilization for the example illustrated in FIG. 6.

The preceding examples utilized specific values for the interleave granularity, the size of the display tile, the size of the surface tile, the size of the display, the size of the pages, and other such values to assist with understanding the example techniques described in this disclosure. The following describes the example techniques in more general terms to indicate that the techniques described in this disclosure are extendable to situations where the interleave granularity, the size of the display tile, the size of the surface tile, the size of the display, and other such values are not necessarily the example values used above in the disclosure.

For example, the term "pixel size" is defined as the number of bytes to represent each pixel value, and the term "tile size" is defined as the number of bytes of a surface tile. For instance, in the above examples, 32 bits, which is 4 bytes, represented a pixel value. Therefore, in the above examples, the pixel size is 4 bytes. Also, in the above example, a surface tile is 4×4 pixel values. Since each pixel values includes 4 bytes, and there are 16 pixel values in a surface tile, then the tile size in the above examples is 64 bytes.

Suppose that the width of a surface such as surface 32A or surface 32B in pixels is w pixels, the pixel size is z bytes, and the height of each surface tile within the surface is v pixels. In this case, the term "surface stride" (s) is defined as $s=z*w*v$. As described above, MIF 20 may store the pixel values of surface 32A in linear fashion. In this case, the value of v may be equal to one pixel because the height of each row of surface 32A is one pixel.

For example, assume that surface 32A is 32 pixels wide and the pixel size is 4 bytes. Also, because surface 32A is stored in linear fashion, the height of each row is one pixel. Then, the surface stride (s) for surface 32A is 128 bytes (i.e., 4*32*1 equals 128). As another example, assume that surface 32B is 32 pixels wide, the pixel size is 4 byes, and the surface tile is 4×4. In this example, the surface stride (s) for surface 32B is 512 bytes (i.e., 4*32*4 equals 512).

The surface stride of a surface may be referred to as a "snap stride" if the surface stride is a multiple of "N" bytes, which is the size of one or more surface tiles. For example, a surface tile is 1×1 pixel values for a linear surface. N may be referred to as a snap size. For example, 128 pixel values, 256 pixel values, and 2048 pixel values are all snap strides for a snap size (N) of 128 bytes. Similarly, 512 pixel values and 1024 pixel values are all snap strides for a snap size (N) of 512 bytes.

The corresponding width of a snap stride may be referred to as a snap width. For example, 64 is a snap width of a linear surface with snap size 128 and pixel size 4 because the stride for the linear surface is 256. In this example, because the linear surface is multiple of 128 bytes, and 128 bytes is the size of one or more surface tiles, the linear surface may be considered as a snap stride with snap size of 128 bytes and a snap width of 64 pixel values. For a 4×4 surface tile, 64 pixel values may be a snap width of such a 4×4 surface tile with a snap size of 512 bytes, and pixel size of 4 since the stride of 1024 bytes is a multiple of 512 bytes.

The term "snap interval" may be pixel values in the width of a snap size (N), which is in bytes. Snap coordinates may be determined from the snap interval. For example, suppose pixel coordinates are (x, y) in a surface. Then, snap coordinate may be defines as X=floor (x/snap interval). Snap coordinates (X, y) are integers. Also, if the interleave granularity is a multiple of the snap size, each pixel of a snap interval may be retrieved from the same memory unit 26 via the same MC 22.

Table 1 below illustrates channel functions of a linear surface where the surface width is 160 pixel values, surface height is 32 pixel values, the pixel size is 4 bytes, the interleave granularity is 1024 bytes, there are two memory channels (e.g., two MCs 22 that each establish one channel to one memory unit 26 within system memory 24), there is no byte padding, and the snap interval is 32. Channel function, c(X, y), in Table 1, indicates which of the two channels is utilized to retrieve pixel values from system memory 24.

For instance, in the example of Table 1, there are two memory channels to system memory 24 (e.g., one channel from MC 22A to memory unit 26A, and one channel from MC 22N to memory unit 26N). In Table 1, the memory channel from MC 22A to memory unit 26A is referred to channel 0, and the memory channel from MC 22N to memory unit 22N is referred to channel 1.

As described above, the snap coordinate (X)=floor (x/snap interval). In the example of Table 1, the snap interval is 32, and the width is 160 pixel values (e.g., pixel values with x-coordinate of 0 to x-coordinate of 159). Accordingly, for the snap coordinate X for x-coordinates of linear surface from x=0 to x=31 will be 0, the snap coordinate X for x-coordinates of linear surface from x=32 to x=63 will be 1, the snap coordinate X for x-coordinates of linear surface x=64 to 95 will be 2, the snap coordinate X for x-coordinates of linear surface x=96 to 127 will be 3, and the snap coordinate X for x-coordinates of linear surface x=128 to 159 will be 4.

Also, as described above, all the pixel values encompassed by a snap interval are stored in system memory 24 via either MC 22A or MC 22N, but not both. Such storage is illustrated in Table 1. For example, in the row in Table 1 where y=1, c(X, y) equals 0 for X=0, 0 for X=1, 0 for X=2, 1 for X=3, and 1 for X=4. This means that pixel values of the linear surface that are located at x=0 to 31 (e.g., where X=0), and y=1, are stored in memory unit 22A via MC 22A (hence the value of 0 in Table 1), pixel values of the linear surface that are located at x=32 to 63 (e.g., where X=1), and y=1, are stored in memory unit 22A via MC 22A (hence the value of 0 in Table 1), and pixel values of the linear surface that are located at x=64 to 95 (e.g., where X=2), and y=1, are stored in memory unit 22A via MC 22A (hence the value of 0 in Table 1). For pixel values of the linear surface that are located at x=96 to 127 (e.g., where X=3), and y=1, these pixel values are stored in memory unit 22N via MC 22N (hence the value of 1 in Table 1), and for pixel values of the linear surface that are located at x=128 to 159 (e.g., where X=4), and y=1, these pixel values are stored in memory unit 22N via MC 22N (hence the value of 1 in Table 1).

TABLE 1

| | c(X, y) | | | | |
|---|---|---|---|---|---|
| y | X = 0 | X = 1 | X = 2 | X = 3 | X = 4 |
| 0  | 0 | 0 | 0 | 0 | 0 |
| 1  | 0 | 0 | 0 | 1 | 1 |
| 2  | 1 | 1 | 1 | 1 | 1 |
| 3  | 1 | 0 | 0 | 0 | 0 |
| 4  | 0 | 0 | 0 | 0 | 1 |
| 5  | 1 | 1 | 1 | 1 | 1 |
| 6  | 1 | 1 | 0 | 0 | 0 |
| 7  | 0 | 0 | 0 | 0 | 0 |
| 8  | 1 | 1 | 1 | 1 | 1 |
| 9  | 1 | 1 | 1 | 0 | 0 |
| 10 | 0 | 0 | 0 | 0 | 0 |
| 11 | 0 | 1 | 1 | 1 | 1 |
| 12 | 1 | 1 | 1 | 1 | 0 |
| 13 | 0 | 0 | 0 | 0 | 0 |
| 14 | 0 | 0 | 1 | 1 | 1 |
| 15 | 1 | 1 | 1 | 1 | 1 |
| 16 | 0 | 0 | 0 | 0 | 0 |
| 17 | 0 | 0 | 0 | 1 | 1 |
| 18 | 1 | 1 | 1 | 1 | 1 |
| 19 | 1 | 0 | 0 | 0 | 0 |
| 20 | 0 | 0 | 0 | 0 | 1 |
| 21 | 1 | 1 | 1 | 1 | 1 |
| 22 | 1 | 1 | 0 | 0 | 0 |
| 23 | 0 | 0 | 0 | 0 | 0 |
| 24 | 1 | 1 | 1 | 1 | 1 |
| 25 | 1 | 1 | 1 | 0 | 0 |
| 26 | 0 | 0 | 0 | 0 | 0 |
| 27 | 0 | 1 | 1 | 1 | 1 |
| 28 | 1 | 1 | 1 | 1 | 0 |
| 29 | 0 | 0 | 0 | 0 | 0 |
| 30 | 0 | 0 | 1 | 1 | 1 |
| 31 | 1 | 1 | 1 | 1 | 1 |

Table 1 indicates the channel function c(X, y) for each of the snap coordinates (X=0 to 4) for a linear surface with a width of 160 pixel values. In Table 1, and as illustrated in FIGS. 17A and 17B, the channel function c(X, y) for each of the snap coordinates (X=0 to 4) is a periodic function, and may be the same function except that initial phases for each of the snap coordinates may be different.

Figure 17A:
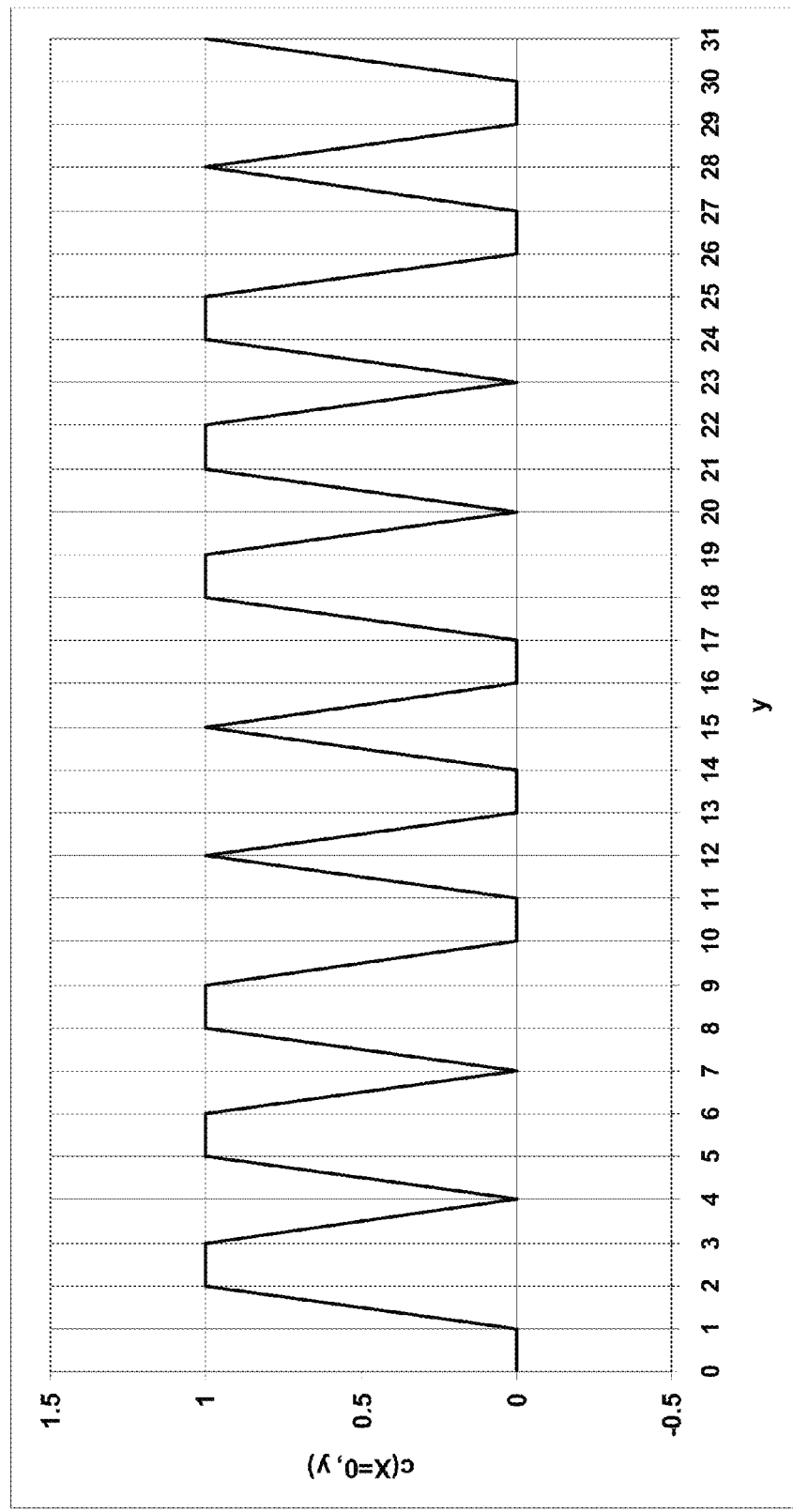
FIGS. 17A and 17B are graphical diagrams illustrating examples of channel functions.
Figure 17B:
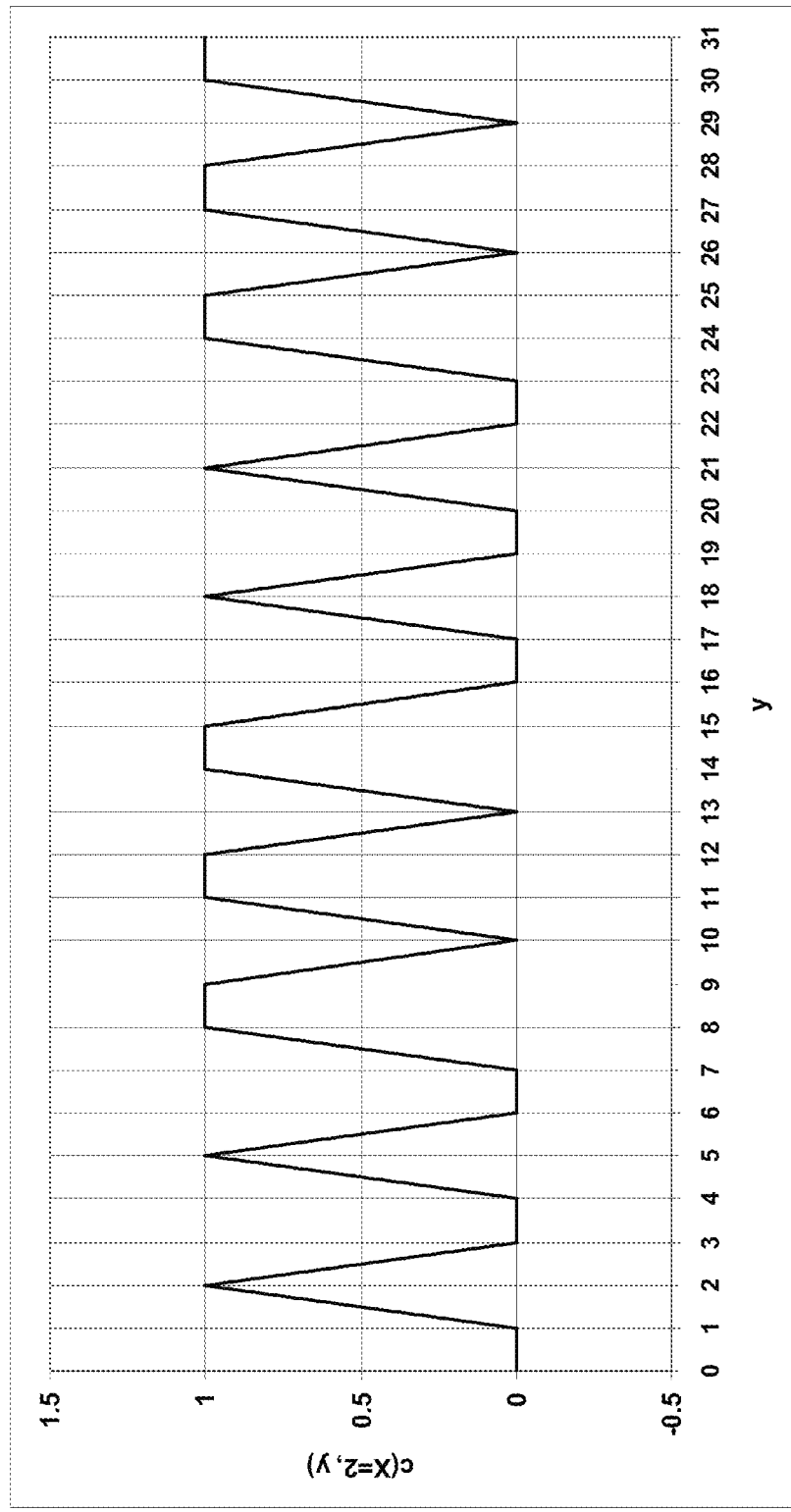

FIGS. 17A and 17B are graphical diagrams illustrating examples of channel functions. For example, FIG. 17A is a graph that illustrates c(0, y) as a function of y of Table 1, and FIG. 17B is a graph that illustrates c(2, y) as a function of y of Table 1. In FIGS. 17A and 17B, the x-axis corresponds to y of Table 1, and y-axis corresponds to c(X=0, y) for FIG. 17A, and c(X=2, y) for FIG. 17B. In FIGS. 17A and 17B, the channel function (i.e., c(X=0, y) of FIG. 17A and c(X=2, y) of FIG. 17B) repeat 16 pixel values of the linear surface.

Because the linear surface may be the same size as the display of device 10, the channel function may be considered as repeating every 16 pixels along the y-axis of the display of device 10. Also, the channel functions illustrated in FIGS. 17A and 17B may be the same channel function, but with different initial phases. For example, c(X=2, y), as illustrated in FIG. 17B, is equal to c(X=0, y), as illustrated in FIG. 17A, if c(X=2, y) were phase-shifted by 10. In other words, c(X=2, y) equals c(X=0, y+10). The other channel functions in Table 1 may exhibit similar characteristics as c(X=0, y) and c(X=2, y), but may be phase shifted by amounts other than 10 relative c(X=0, y).

In some examples, channel utilization (e.g., the access of memory units 26A and 26N via MC 22A and 22N) may not be optimal if channel functions have a period of 1, or if the display tile height is greater than the channel function period. For example, in the examples illustrated in FIG. 4, which was for surface 32A stored in a linear fashion, the display tile height was 16 pixels. Also, if the channel functions were calculated for the surface 32A, in a manner similar to that of Table 1 or Table 2 (as described below), the channel function period would be 1. Therefore, in the example illustrated in FIG. 4, the display tile height, which was 16 pixels, is greater than the channel function period, and padding bytes may assist in better channel utilization when retrieving pixel values for rendering. For example, reserving padding bytes as described with respect to FIG. 8 resulted in better channel utilization when MIF 20 retrieves the pixel values from memory units 26A and 26B via MCs 22A and 22N for rendering.

The techniques described in this disclosure related to reserving padding bytes may address the conditions where channel utilization may not be optimal. For example, if the channel function period is 1, the padding bytes may increase the period of the channel function to be greater than 1. Also, if the display tile height is greater than the channel function period, padding bytes may decrease the channel function period. As described above, padding bytes may increase the amount of memory that is needed to store pixel values of the surfaces that are to be rendered (e.g., increase memory footprint of the surface in system memory). It may be desirable to pad with the least number of bytes needed to achieve balance of channel utilization to minimize the overhead of memory needed to store the surface.

The following describes examples of the manner in which to select the number of padding bytes. Assume that there are n channels to system memory 24 (e.g., the number of MCs 22A and the number of memory units 26 equals n). Also, assume that the interleave granularity is f. The term "interleave period" (d) may be defined as d equals n*f. For example, the interleave period is 2048 bytes if there are two channels and the interleave granularity is 1024 bytes. As another example, the interleave period is 4096 bytes if there are four channels and the interleave granularity is 1024 bytes.

It may be possible for the interleave period to be larger than a size of a page (e.g., physical page 30 of FIG. 2). If the interleave period is less than or equal to the size of the page, all channels may be balanced within the page. For example, all channels may be used to store pixel values into the page.

Given a surface stride s and interleave period d, channel function period p may be calculated as follows: p(w)=(d*m)/s, where m is the minimum number that makes p an integer, and w is the width of the surface. Table 2 below indicates the channel function period for dual-channel with 1 kB interleave granularity. As indicated above, dual-channel may mean that there are two channels (e.g., one from MC 22A to memory unit 26A, and another from MC 22N to memory unit 26N).

TABLE 2

| Surface width in pixels | Stride in bytes | Interleave period in bytes | m | Channel function period |
|---|---|---|---|---|
| 32 | 128 | 2048 | 1 | 16 |
| 64 | 256 | 2048 | 1 | 8 |

TABLE 2-continued

| Surface width in pixels | Stride in bytes | Interleave period in bytes | m | Channel function period |
|---|---|---|---|---|
| 96 | 384 | 2048 | 3 | 16 |
| 128 | 512 | 2048 | 1 | 4 |
| 160 | 640 | 2048 | 5 | 16 |
| 192 | 768 | 2048 | 3 | 8 |
| 24 | 896 | 2048 | 7 | 16 |
| 256 | 1024 | 2048 | 1 | 2 |
| 288 | 1152 | 2048 | 9 | 16 |
| 320 | 1280 | 2048 | 5 | 8 |
| 352 | 1408 | 2048 | 11 | 16 |
| 384 | 1536 | 2048 | 3 | 4 |
| 416 | 1664 | 2048 | 13 | 16 |
| 448 | 1792 | 2048 | 7 | 8 |
| 480 | 1920 | 2048 | 15 | 16 |
| 512 | 2048 | 2048 | 1 | 1 |

Table 2 is an example of how to determine channel function periods assuming there are two channels, the interleave granularity is 1 kB, and the pixel size is 4. The pixel values may be evenly distributed among all channels over a full interleave period. Pixel values may be evenly distributed among all channels at each snap coordinate over a full channel function period when the period is greater than 1.

As indicated above, padding bytes may assist with more optimal channel utilization if the channel function period is 1 or the channel function period is greater than or equal to display tile height. Table 3 illustrates padding requirements for different display tile heights assuming two channels, an interleave granularity of 1024 bytes, and pixel size of 4.

TABLE 3

| Width in pixels | Period | Screen tile height 2 | Screen tile height 4 | Screen tile height 8 | Screen tile height 16 |
|---|---|---|---|---|---|
| 32 | 16 | Yes | Yes | Yes | No |
| 64 | 8 | Yes | Yes | No | No |
| 96 | 16 | Yes | Yes | Yes | No |
| 128 | 4 | Yes | No | No | No |
| 160 | 16 | Yes | Yes | Yes | No |
| 192 | 8 | Yes | Yes | No | No |
| 224 | 16 | Yes | Yes | Yes | No |
| 256 | 2 | No | No | No | No |
| 288 | 16 | Yes | Yes | Yes | No |
| 320 | 8 | Yes | Yes | No | No |
| 352 | 16 | Yes | Yes | Yes | No |
| 384 | 4 | Yes | No | No | No |
| 416 | 16 | Yes | Yes | Yes | No |
| 448 | 8 | Yes | Yes | No | No |
| 480 | 16 | Yes | Yes | Yes | No |
| 512 | 1 | Yes | Yes | Yes | Yes |

In some cases, the period function p(w) may itself be a periodic function. The period of p(w) may be the minimum surface width that has a channel function period of 1. For example, assume the minimum surface width that has a channel function period of 1 is q. For w that is less than q, p(w) equals p(w+kq) where k is a positive integer. Suppose that p(w)=(d·m1)/s; then, p(w+kq) equals (dm)/(kd+(d·m1)/(pw)). The value of (dm)/(kd+(d·m1)/(pw)) equals p(w)·m/(p(w)·k+m1), which equals p(w) by setting m=p(w)·k+m1. In some examples, it may not be necessary to consider situations where the width is greater than the width whose stride is equal to the interleave period. For example, for linear surfaces (e.g., surface 32A of FIGS. 4 and 8), where there are two channels and the interleave granularity is 1024 bytes, widths less than or equal to 512 pixel values may determine the padding requirements.

The above calculations to determine the number of padding bytes that should be reserved may be summarized with the following pseudo-code. This pseudo-code is provided for ease of understanding, and the techniques described in this disclosure should not be considered limited to the specific pseudo-code.

Padding Algorithm:

```
Channel count n; // example 2, one from MC 22A to memory unit
26A, and one from MC 22N to memory unit 26N
    Interleave granularity f; // example 1024 bytes
    Pixel size b; // example 4 bytes per size
    Display tile height h; // 2, 4, 8, 16
    Surface tile height v; // example 1, 4
    Screen width W; // example 2048 pixels
    Proper screen width w;
    Minimum screen width q;
    Interleave period d;
    Proper stride s;
    Channel function period p;
    d = n*f; // example 2048
    q = d/(v*b); // example 512, 128
    w = W % q; // example 0
    if (w == 0)
        w = q; // example 512, 128
    s = w*v*b; // example 2048
    Find minimum integer m such that p = dm/s is an integer; //example
p = 1 and m = 1
    p *= v; // convert from number of display tiles to number of pixels
    if (p == v or p > h)
    {
        Find next width whose channel function period is greater than 1
and less than or equal to h;
        padding = stride of new width − s;
    }
```

Table 4 illustrates padding amounts for some surface resolutions where there are two memory channels to system memory 24, the interleave granularity is 1024 bytes, the pixel size is 4 bytes, the width is in pixels, the padding is in bytes, and h is the display tile height in pixels.

TABLE 4

| | Linear surface | | | | 4 × 4 tiled surface | |
|---|---|---|---|---|---|---|
| Width | h = 2 | H = 4 | h = 8 | h = 16 | h = 8 | h = 16 |
| 32 | 896 | 384 | 128 | 0 | 512 | 0 |
| 64 | 768 | 256 | 0 | 0 | 0 | 0 |
| 96 | 640 | 128 | 128 | 0 | 1536 | 0 |
| 128 | 512 | 0 | 0 | 0 | 1024 | 512 |
| 160 | 384 | 384 | 128 | 0 | 512 | 0 |
| 192 | 256 | 256 | 0 | 0 | 0 | 0 |
| 224 | 128 | 128 | 128 | 0 | 1536 | 0 |
| 256 | 0 | 0 | 0 | 0 | 1024 | 512 |
| 288 | 1920 | 384 | 128 | 0 | 512 | 0 |
| 320 | 1792 | 256 | 0 | 0 | 0 | 0 |
| 352 | 1664 | 128 | 128 | 0 | 1536 | 0 |
| 384 | 1536 | 0 | 0 | 0 | 1024 | 512 |
| 416 | 1408 | 896 | 128 | 0 | 512 | 0 |
| 448 | 1280 | 768 | 0 | 0 | 0 | 0 |
| 480 | 1152 | 640 | 384 | 0 | 1536 | 0 |
| 512 | 1024 | 512 | 256 | 128 | 1024 | 512 |
| 544 | 896 | 384 | 128 | 0 | 512 | 0 |
| 576 | 768 | 256 | 0 | 0 | 0 | 0 |
| 608 | 640 | 128 | 128 | 0 | 1536 | 0 |
| 640 | 512 | 0 | 0 | 0 | 1024 | 512 |
| 672 | 384 | 384 | 128 | 0 | 512 | 0 |
| 704 | 256 | 256 | 0 | 0 | 0 | 0 |
| 736 | 128 | 128 | 128 | 0 | 1536 | 0 |
| 768 | 0 | 0 | 0 | 0 | 1024 | 512 |
| 800 | 1920 | 384 | 128 | 0 | 512 | 0 |
| 832 | 1792 | 256 | 0 | 0 | 0 | 0 |
| 864 | 1664 | 128 | 128 | 0 | 1536 | 0 |
| 896 | 1536 | 0 | 0 | 0 | 1024 | 512 |
| 928 | 1408 | 896 | 128 | 0 | 512 | 0 |
| 960 | 1280 | 768 | 0 | 0 | 0 | 0 |
| 992 | 1152 | 640 | 384 | 0 | 1536 | 0 |

TABLE 4-continued

| | Linear surface | | | | 4 × 4 tiled surface | |
|---|---|---|---|---|---|---|
| Width | h = 2 | H = 4 | h = 8 | h = 16 | h = 8 | h = 16 |
| 1024 | 1024 | 512 | 256 | 128 | 1024 | 512 |
| 1056 | 896 | 384 | 128 | 0 | 512 | 0 |
| 1088 | 768 | 256 | 0 | 0 | 0 | 0 |
| 1120 | 640 | 128 | 128 | 0 | 1536 | 0 |
| 1152 | 512 | 0 | 0 | 0 | 1024 | 512 |
| 1184 | 384 | 384 | 128 | 0 | 512 | 0 |
| 1216 | 256 | 256 | 0 | 0 | 0 | 0 |
| 1248 | 128 | 128 | 128 | 0 | 1536 | 0 |
| 1280 | 0 | 0 | 0 | 0 | 1024 | 512 |
| 1312 | 1920 | 384 | 128 | 0 | 512 | 0 |
| 1344 | 1792 | 256 | 0 | 0 | 0 | 0 |
| 1376 | 1664 | 128 | 128 | 0 | 1536 | 0 |
| 1408 | 1536 | 0 | 0 | 0 | 1024 | 512 |
| 1440 | 1408 | 896 | 128 | 0 | 512 | 0 |
| 1472 | 1280 | 768 | 0 | 0 | 0 | 0 |
| 1504 | 1152 | 640 | 384 | 0 | 1536 | 0 |
| 1536 | 1024 | 512 | 256 | 128 | 1024 | 512 |
| 1568 | 896 | 384 | 128 | 0 | 512 | 0 |
| 1600 | 768 | 256 | 0 | 0 | 0 | 0 |
| 1632 | 640 | 128 | 128 | 0 | 1536 | 0 |
| 1664 | 512 | 0 | 0 | 0 | 1024 | 512 |
| 1696 | 384 | 384 | 128 | 0 | 512 | 0 |
| 1728 | 256 | 256 | 0 | 0 | 0 | 0 |
| 1760 | 128 | 128 | 128 | 0 | 1536 | 0 |
| 1792 | 0 | 0 | 0 | 0 | 1024 | 512 |
| 1824 | 1920 | 384 | 128 | 0 | 512 | 0 |
| 1856 | 1792 | 256 | 0 | 0 | 0 | 0 |
| 1888 | 1664 | 128 | 128 | 0 | 1536 | 0 |
| 1920 | 1536 | 0 | 0 | 0 | 1024 | 512 |
| 1952 | 1408 | 896 | 128 | 0 | 512 | 0 |
| 1984 | 1280 | 768 | 0 | 0 | 0 | 0 |
| 2016 | 1152 | 640 | 384 | 0 | 1536 | 0 |
| 2048 | 1024 | 512 | 256 | 128 | 1024 | 512 |
| 2080 | 896 | 384 | 128 | 0 | 512 | 0 |
| 2112 | 768 | 256 | 0 | 0 | 0 | 0 |
| 2144 | 640 | 128 | 128 | 0 | 1536 | 0 |
| 2176 | 512 | 0 | 0 | 0 | 1024 | 512 |
| 2208 | 384 | 384 | 128 | 0 | 512 | 0 |
| 2240 | 256 | 256 | 0 | 0 | 0 | 0 |
| 2272 | 128 | 128 | 128 | 0 | 1536 | 0 |
| 2304 | 0 | 0 | 0 | 0 | 1024 | 512 |
| 2336 | 1920 | 384 | 128 | 0 | 512 | 0 |
| 2368 | 1792 | 256 | 0 | 0 | 0 | 0 |
| 2400 | 1664 | 128 | 128 | 0 | 1536 | 0 |
| 2432 | 1536 | 0 | 0 | 0 | 1024 | 512 |
| 2464 | 1408 | 896 | 128 | 0 | 512 | 0 |
| 2496 | 1280 | 768 | 0 | 0 | 0 | 0 |
| 2528 | 1152 | 640 | 384 | 0 | 1536 | 0 |
| 2560 | 1024 | 512 | 256 | 128 | 1024 | 512 |

Figure 18:
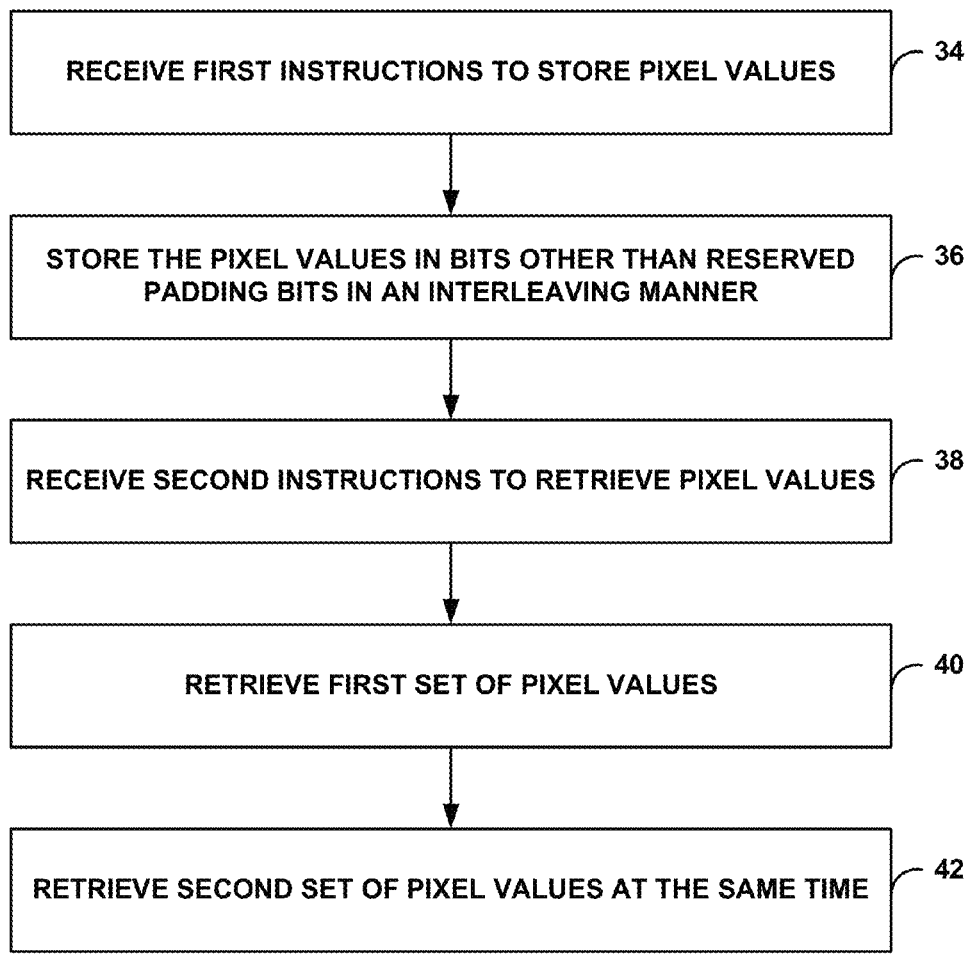
FIG. 18 is a flowchart illustrating an example technique in accordance with one or more examples described in this disclosure.

FIG. 18 is a flowchart illustrating an example technique in accordance with one or more examples described in this disclosure. For purposes of illustration only, reference is made to FIGS. 1-16.

A memory interface may receive a first plurality of instructions that instruct the memory interface to store pixel values of a surface in a system memory (34). For example, a processing unit such as GPU 14 may transmit instructions to MIF 20 that instruct MIF 20 to store pixel value of a surface such as surface 32A or 32B in system memory 24.

The memory interface may store the pixel values of the surface, in bits of the system memory other than reserved padding bits in the system memory, in an interleaving manner between at least a first memory unit of the system memory via a first memory controller, and a second, different memory unit of the system memory via a second, different memory controller such that a first set of pixel values of a display tile are stored within the first memory unit via the first memory controller and a second set of pixel values of the same display tile are stored within the second memory unit via the second memory controller (36). For example, MIF 20 may store the pixel values of surface 32A or 32B (e.g., line-by-line or tile-by-tile), in bits of system memory 24 other than the reserved padding bits, illustrated by reference number 37 in FIGS. 8-14 and 16.

MIF 20 may store the pixel values in an interleaving manner, based on an interleave granularity, between at least memory unit 26A of system memory 24 via MC 22A and memory unit 26B of system memory 24 via MC 22N. For example, the interleave granularity may indicate a number of bits that MIF 20 stores in memory unit 26A via MC 22A before storing bits in memory unit 26N via MC 22N. As described above, MIF 20 may store the pixel values in such an interleaving manner such that memory unit 26A stores a first set of pixel values for a display tile, and memory unit 26N stores a second set of pixel values for the same display tile. For example, a display tile may be a column of surface 32A or surface 32B as illustrated in FIGS. 8-14.

In some examples, in addition to receiving the first plurality of instructions, MIF 20 may also receive virtual addresses from a processing unit (e.g., GPU 14) of where the pixel values of the surface are to be stored. MMU 21 of MIF 20 may map the virtual addresses to the physical addresses of the bits in system memory 24 other than the padding bits. In this example, MIF 20 may store the pixel values of the surface in bits other than the padding bits based on the physical addresses.

Also, in some examples, a processing unit such as one of processor 16 or GPU 14 may reserve the padding bits. For instance, a first processing unit (e.g., processor 16) may reserve the padding bits, and MIF 20 may receive the first plurality of instructions from a second, different processing unit (e.g., GPU 14). As another example, a processing unit (e.g., GPU 14) may reserve the padding bits, and MIF 20 may receive the first plurality of instructions from the processing unit (e.g., GPU 14).

In some examples, a processing unit (e.g., processor 16 or GPU 14) may determine a number of padding bits that cause a number of bits needed to store the first set of pixel values of the display tile to equal a number of bits needed to store the second set of pixel values of the display tile. In this example, the processing unit may reserve the padding bits based on the determined number of padding bits.

As illustrated in FIG. 18, the memory interface may receive a second plurality of instructions to retrieve the pixel values of the surface from the system memory (38). For example, MIF 20 may receive such instructions when GPU 14 desires to render the display tile, where GPU 14 generated the first and second set of pixel values for that display tile.

In response to the second plurality of instructions, the memory interface may retrieve the first set of pixel values of the display tile from the first memory unit via the first memory controller (40). Also, in response to the second plurality of instructions, at a same time as retrieving the first set of pixel values, the memory interface may retrieve the second set of pixel values of the display tile from the second memory unit via the second memory controller (42). For example, MIF 20 may retrieve the first set of pixel values for a first set of pixels of the display tile from memory unit 26A via MC 22A, and at the same time, retrieve the second set of pixel values for a second set of pixels of the same display tile from memory unit 26N via MC 22N.

Figure 19:
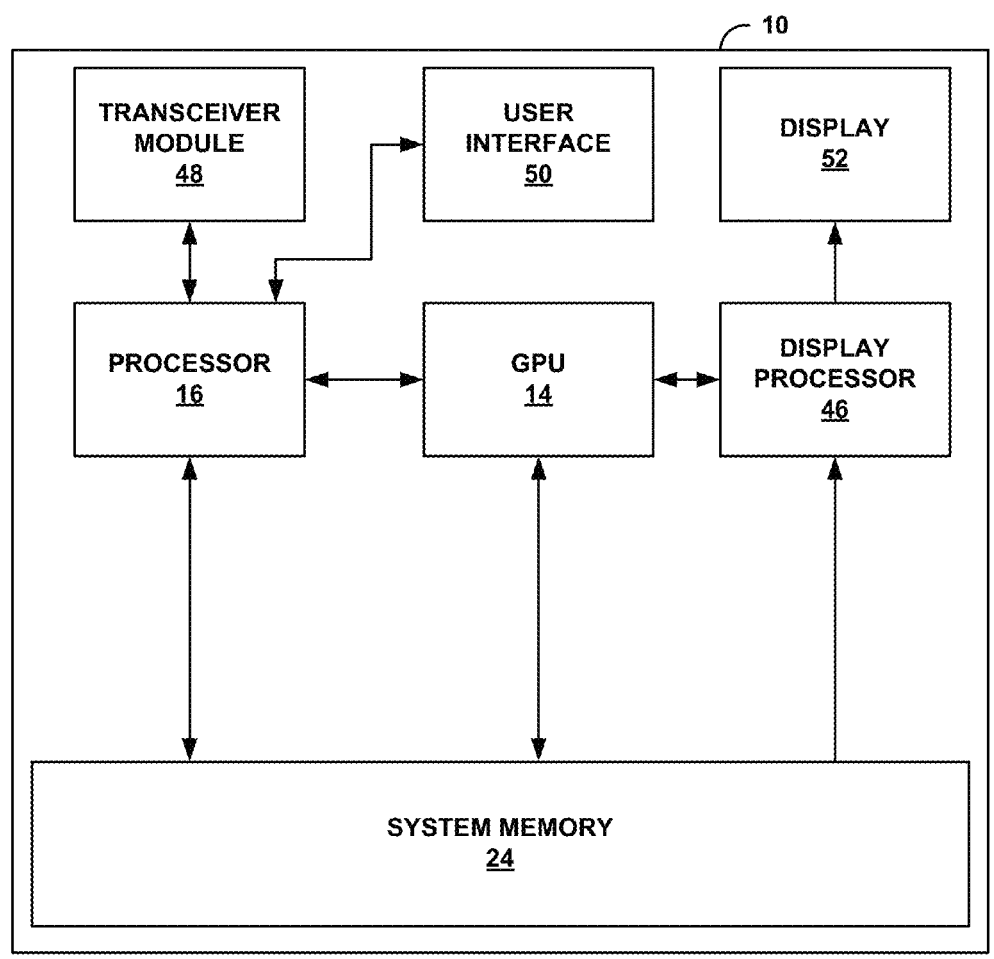
FIG. 19 is a block diagram illustrating another example of a device that may be configured to implement one or more aspects of this disclosure.

FIG. 19 is a block diagram illustrating another example of a device that may be configured to implement one or more aspects of this disclosure. For example, FIG. 19 illustrates device 10 of FIG. 1 in greater detail. For purposes of brevity, only the components of device 10 that are illustrated in FIG. 19, but not illustrated in FIG. 1 are described in detail.

In the example of FIG. 19, device 10 may include display 52, processor 16, GPU 14, system memory 24, display processor 46, transceiver module 48, and user interface 50. Processor 16, GPU 14, and system memory 24, as illustrated in FIG. 19, may be substantially similar to those illustrated in FIG. 1. Furthermore, transceiver module 48 and display processor 46 may both be part of IC 12, may both be external to IC 12, or one may be part of IC 12 and the other external to IC 12.

Device 10 may include additional modules or units not shown in FIG. 19 for purposes of clarity. For example, device 10 may include a speaker and a microphone, neither of which are shown in FIG. 19, to effectuate telephonic communications in examples where device 10 is a mobile wireless telephone, or a speaker where device 10 is a media player. Device 10 may also include a video camera. Furthermore, the various modules and units shown in device 10 may not be necessary in every example of device 10. For example, user interface 50 and display 52 may be external to device 10 in examples where device 10 is a desktop computer or other device that is equipped to interface with an external user interface or display.

Examples of user interface 50 include, but are not limited to, a trackball, a mouse, a keyboard, and other types of input devices. User interface 50 may also be a touch screen and may be incorporated as a part of display 52. Transceiver module 48 may include circuitry to allow wireless or wired communication between device 10 and another device or a network. Transceiver module 48 may include modulators, demodulators, amplifiers and other such circuitry for wired or wireless communication.

Display 52 may the display of device 10 that displays the image content generated by GPU 14. For example, during the rasterization process, GPU 14 may divide display 52 to the display tiles, and render the image into each one of the display tiles. Display 52 may be a liquid crystal display (LCD), an organic light emitting diode display (OLED), a cathode ray tube (CRT) display, a plasma display, or another type of display device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
  receiving, with a memory interface, a plurality of instructions that instruct the memory interface to store pixel values of a surface in a system memory; and
  storing, with the memory interface, the pixel values of the surface, in bits of the system memory other than reserved padding bits in the system memory, in an interleaving manner based on an interleave granularity between at least a first memory unit of the system memory via a first memory controller, and a second, different memory unit of the system memory via a second, different memory controller causing a first set of pixel values of a display tile to be stored within the first memory unit via the first memory controller, and a second set of pixel values of the same display tile to be stored within the second memory unit via the second memory controller, wherein the interleave granularity indicates a number of bits that the memory interface stores in the first memory unit via the first memory controller before storing bits in the second memory unit via the second memory controller, and
  wherein storing the pixel values of the surface comprises counting the reserved padding bits as part of the number of bits that are stored in the first memory unit before storing bits in the second memory unit.

2. The method of claim 1, further comprising:
  receiving, with the memory interface, virtual addresses of where the pixel values of the surface are to be stored; and
  mapping, with a memory management unit (MMU) the memory interface, the virtual addresses to physical addresses of the bits of the system memory other than the reserved padding bits in the system memory,
  wherein storing the pixel values of the surface comprises storing pixel values of the surface, in the bits of the system memory other than the reserved padding bits in the system memory, based on the physical addresses of the bits of the system memory other than the reserved padding bits in the system memory.

3. The method of claim 1, wherein storing comprises storing the pixel values of the surface, in bits of pages of the system memory, in the interleaving manner.

4. The method of claim 1, wherein storing comprises storing the pixel values of a line of the surface, in bits of the system memory other than reserved padding bits in the system memory, in the interleaving manner.

5. The method of claim 1, wherein storing comprises storing the pixel values of a tile of the surface, in bits of the system memory other than reserved padding bits in the system memory, in the interleaving manner.

6. The method of claim 1, further comprising:
determining a number of the padding bits that cause a number of bits needed to store the first set of pixel values to equal a number of bits needed to store the second set of pixel values; and
reserving the padding bits based on the determined number.

7. The method of claim 1, further comprising:
reserving, with a first processing unit, the padding bits,
wherein receiving the plurality of instructions comprises receiving the plurality of instructions from a second, different processing unit.

8. The method of claim 7, wherein the first processing unit comprises a processor, and wherein the second processing unit comprises a graphics processing unit.

9. The method of claim 7, wherein reserving the padding bits comprises reserving, with a driver executing on the first processing unit, the padding bits.

10. The method of claim 1, further comprising:
reserving, with a processing unit, the padding bits,
wherein receiving the plurality of instructions comprises receiving the plurality of instructions from the processing unit.

11. The method of claim 10, wherein the processing unit comprises a graphics processing unit (GPU).

12. The method of claim 1, wherein the plurality of instructions comprises a first plurality of instructions, the method further comprising:
receiving, with the memory interface, a second plurality of instructions to retrieve the pixel values of the surface from the system memory;
in response to the second plurality of instructions, retrieving, with the memory interface, the first set of pixel values of the display tile from the first memory unit via the first memory controller; and
in response to the second plurality of instructions, at a same time as retrieving the first set of pixel values, retrieving, with the memory interface, the second set of pixel values of the display tile from the second memory unit via the second memory controller.

13. The method of claim 12, further comprising:
rendering the display tile on a display based on the retrieved first set of pixel values and the second set of pixel values.

14. The method of claim 1, further comprising:
generating, with a processing unit, the first set of pixel values of the display tile; and
generating, with the processing unit, the second set of pixel values of the display tile.

15. An integrated circuit (IC) comprising:
a first memory controller operatively coupled to a first memory unit of a system memory;
a second, different memory controller operatively coupled to a second, different memory unit of the system memory; and
a memory interface configured to:
receive a plurality of instructions that instruct the memory interface to store pixel values of a surface in the system memory; and
store the pixel values of the surface, in bits of the system memory other than reserved padding bits in the system memory, in an interleaving manner based on an interleave granularity between at least the first memory unit of the system memory via the first memory controller, and the second, different memory unit of the system memory via the second, different memory controller causing a first set of pixel values of a display tile to be stored within the first memory unit via the first memory controller and a second set of pixel values of the same display tile to be stored within the second memory unit via the second memory controller, wherein the interleave granularity indicates a number of bits that the memory interface stores in the first memory unit via the first memory controller before storing bits in the second memory unit via the second memory controller, and
wherein to store the pixel values of the surface, the memory interface is configured to count the reserved padding bits as part of the number of bits that are stored in the first memory unit before storing bits in the second memory unit.

16. The IC of claim 15, wherein the memory interface comprises a memory management unit (MMU), and wherein the memory interface is configured to:
receive virtual addresses of where the pixel values of the surface are to be stored;
map, with the MMU, the virtual addresses to physical addresses of the bits of the system memory other than the reserved padding bits in the system memory; and
store the pixel values of the surface, in the bits of the system memory other than the reserved padding bits in the system memory, based on the physical addresses of the bits of the system memory other than the reserved padding bits in the system memory.

17. The IC of claim 15, wherein the memory interface is configured to store the pixel values of the surface, in bits of pages of the system memory, in the interleaving manner.

18. The IC of claim 15, wherein the memory interface is configured to store the pixel values of a line of the surface, in bits of the system memory other than reserved padding bits in the system memory, in the interleaving manner.

19. The IC of claim 15, wherein the memory interface is configured to store the pixel values of a tile of the surface, in bits of the system memory other than reserved padding bits in the system memory, in the interleaving manner.

20. The IC of claim 15, further comprising a processing circuit configured to:
determine a number of the padding bits that cause a number of bits needed to store the first set of pixel values to equal a number of bits needed to store the second set of pixel values; and
reserve the padding bits based on the determined number.

21. The IC of claim 15, further comprising a first processing circuit and a second, different processing circuit, wherein the first processing circuit is configured to reserve the padding bits, and wherein the memory interface is configured to receive the plurality of instructions from the second processing circuit.

22. The IC of claim 21, wherein the first processing circuit comprises a processor, and wherein the second processing circuit comprises a graphics processing unit.

23. The IC of claim 21, wherein the first processing circuit is configured to execute a driver, and reserve the padding bits with the driver.

24. The IC of claim 15, further comprising a processing circuit configured to reserve the padding bits, and wherein the memory interface receives the plurality of instructions from the processing circuit.

25. The IC of claim 24, wherein the processing circuit comprises a graphics processing unit.

26. The IC of claim 15, wherein the plurality of instructions comprises a first plurality of instructions, and wherein the memory interface is configured to:
   receive a second plurality of instructions to retrieve the pixel values of the surface from the system memory;
   in response to the second plurality of instructions, retrieve the first set of pixel values of the display tile from the first memory unit via the first memory controller; and
   in response to the second plurality of instructions, at a same time as retrieving the first set of pixel values, retrieve the second set of pixel values of the display tile from the second memory unit via the second memory controller.

27. The IC of claim 26, further comprising a processing circuit configured to render the display tile on a display based on the retrieved first set of pixel values and the second set of pixel values.

28. The IC of claim 15, further comprising a processing circuit configured to:
   generate the first set of pixel values of the display tile; and
   generate the second set of pixel values of the display tile.

29. A device comprising:
   a system memory comprising at least a first memory unit and a second, different memory unit; and
   an integrated circuit (IC) comprising:
      a first memory controller operatively coupled to the first memory unit of the system memory;
      a second, different memory controller operatively coupled to the second, different memory unit of the system memory; and
      a memory interface configured to:
         receive a plurality of instructions that instruct the memory interface to store pixel values of a surface in the system memory; and
         store the pixel values of the surface, in bits of the system memory other than reserved padding bits in the system memory, in an interleaving manner based on an interleave granularity between at least the first memory unit of the system memory via the first memory controller, and the second, different memory unit of the system memory via the second, different memory controller causing a first set of pixel values of a display tile to be stored within the first memory unit via the first memory controller and a second set of pixel values of the same display tile to be stored within the second memory unit via the second memory controller, wherein the interleave granularity indicates a number of bits that the memory interface stores in the first memory unit via the first memory controller before storing bits in the second memory unit via the second memory controller, and
         wherein to store the pixel values of the surface, the memory interface is configured to count the reserved padding bits as part of the number of bits that the memory interface stores in the first memory unit before storing bits in the second memory unit.

30. The device of claim 29, wherein the memory interface comprises a memory management unit (MMU), and wherein the memory interface is configured to:
   receive virtual addresses of where the pixel values of the surface are to be stored;
   map, with the MMU, the virtual addresses to physical addresses of the bits of the system memory other than the reserved padding bits in the system memory; and
   store the pixel values of the surface, in the bits of the system memory other than the reserved padding bits in the system memory, based on the physical addresses of the bits of the system memory other than the reserved padding bits in the system memory.

31. The device of claim 29, further comprising a processing unit configured to:
   determine a number of the padding bits that cause a number of bits needed to store the first set of pixel values to equal a number of bits needed to store the second set of pixel values; and
   reserve the padding bits based on the determined number.

32. The device of claim 29, wherein the IC includes the processing unit.

33. The device of claim 29, wherein the plurality of instructions comprises a first plurality of instructions, and wherein the memory interface is configured to:
   receive a second plurality of instructions to retrieve the pixel values of the surface from the system memory;
   in response to the second plurality of instructions, retrieve the first set of pixel values of the display tile from the first memory unit via the first memory controller; and
   in response to the second plurality of instructions, at a same time as retrieving the first set of pixel values, retrieve the second set of pixel values of the display tile from the second memory unit via the second memory controller.

34. The device of claim 33, further comprising:
   a display; and
   a processing unit configured to render the display tile on the display based on the retrieved first set of pixel values and the second set of pixel values.

35. A device comprising:
   a system memory comprising at least a first memory unit and a second, different memory unit; and
   an integrated circuit (IC) comprising:
      a first memory controller operatively coupled to the first memory unit of the system memory;
      a second, different memory controller operatively coupled to the second, different memory unit of the system memory; and
      means for receiving a plurality of instructions that instruct the memory interface to store pixel values of a surface in a system memory; and
      means for storing the pixel values of a surface, in bits of the system memory other than reserved padding bits in the system memory, in an interleaving manner based on an interleave granularity between at least a first memory unit of the system memory via a first memory controller, and a second, different memory unit of the system memory via a second, different memory controller causing a first set of pixel values of a display tile to be stored within the first memory unit via the first memory controller and a second set of pixel values of the same display tile to be stored within the second memory unit via the second memory controller, wherein the interleave granularity indicates a number of bits that the memory interface stores in the first memory unit via the first memory controller before storing bits in the second memory unit via the second memory controller, and wherein the means for storing the pixel values of the surface comprises means for counting the reserved padding bits as part of the number of bits that the memory interface stores in the first memory unit before storing bits in the second memory unit.

36. A non-transitory computer-readable storage medium having stored thereon instructions that upon execution cause one or more processors to:

instruct a memory interface to store pixel values of a surface, in bits of a system memory other than reserved padding bits in the system memory, in an interleaving manner based on an interleave granularity between at least a first memory unit of the system memory via a first memory controller, and a second, different memory unit of the system memory via a second, different memory controller causing a first set of pixel values of a display tile to be stored within the first memory unit via the first memory controller and a second set of pixel values of the same display tile to be stored within the second memory unit via the second memory controller, wherein the interleave granularity indicates a number of bits that the memory interface stores in the first memory unit via the first memory controller before storing bits in the second memory unit via the second memory controller, and wherein the instructions that cause the one or more processors to store the pixel values of the surface comprise instructions that cause the one or more processors to count the reserved padding bits as part of the number of bits that are stored in the first memory unit before storing bits in the second memory unit.

* * * * *